(12) United States Patent
Fukuda et al.

(10) Patent No.: US 11,849,019 B2
(45) Date of Patent: Dec. 19, 2023

(54) ENCRYPTION SYSTEM, KEY GENERATION APPARATUS, KEY GENERATION METHOD, KEY GENERATION PROGRAM, AND HOMOMORPHIC OPERATION APPARATUS

(71) Applicant: NEC Corporation, Tokyo (JP)

(72) Inventors: Haruna Fukuda, Tokyo (JP); Hiroto Tamiya, Tokyo (JP); Toshiyuki Isshiki, Tokyo (JP); Masahiro Nara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 151 days.

(21) Appl. No.: 17/432,975

(22) PCT Filed: Feb. 25, 2019

(86) PCT No.: PCT/JP2019/006969
§ 371 (c)(1),
(2) Date: Aug. 23, 2021

(87) PCT Pub. No.: WO2020/174515
PCT Pub. Date: Sep. 3, 2020

(65) Prior Publication Data
US 2022/0166599 A1 May 26, 2022

(51) Int. Cl.
*H04L 9/40* (2022.01)
*G06F 16/245* (2019.01)
(Continued)

(52) U.S. Cl.
CPC ............ *H04L 9/008* (2013.01); *H04L 9/0618* (2013.01); *H04L 9/0822* (2013.01)

(58) Field of Classification Search
CPC ..... H04L 9/008; H04L 9/0618; H04L 9/0822; H04L 9/3231
See application file for complete search history.

(56) References Cited

U.S. PATENT DOCUMENTS

| | | |
|---|---|---|
| 7,054,444 B1 | 5/2006 | Paillier |
| 2012/0233460 A1* | 9/2012 | Kamara ................ H04L 9/3218 713/168 |

(Continued)

FOREIGN PATENT DOCUMENTS

| | | |
|---|---|---|
| JP | 3402441 B2 | 5/2003 |
| JP | 4137385 B2 | 8/2008 |

(Continued)

OTHER PUBLICATIONS

Fully Homomorphic Encryption with Relatively Small Key and Ciphertext Sizes, by Samrt et al., published 2010 (Year: 2010).*

(Continued)

*Primary Examiner* — Vu V Tran

(57) ABSTRACT

An encryption system comprises a key generation apparatus that generates an encryption key relating to the authority to generate a ciphertext from a plaintext, a homomorphic operation key relating to the authority to execute a homomorphic operation on a ciphertext that remains encrypted and whose authority is weaker than that of the encryption key, and a decryption key relating to the authority to decrypt ciphertext; an encryption apparatus that generates a ciphertext from a plaintext using the encryption key; a homomorphic operation apparatus that executes a homomorphic operation on the ciphertext using the homomorphic operation key; and a decryption apparatus that decrypts ciphertext using the decryption key.

16 Claims, 11 Drawing Sheets

(51) Int. Cl.
  *G06F 16/901* (2019.01)
  *G06Q 20/38* (2012.01)
  *G06Q 20/40* (2012.01)
  *H04L 9/00* (2022.01)
  *H04L 9/06* (2006.01)
  *H04L 9/08* (2006.01)

(56) References Cited

U.S. PATENT DOCUMENTS

| | | |
|---|---|---|
| 2016/0173275 A1 | 6/2016 | Yasuda et al. |
| 2016/0204936 A1* | 7/2016 | Sakemi ............... G06F 21/6227 380/28 |
| 2017/0070351 A1 | 3/2017 | Yan |
| 2017/0134156 A1* | 5/2017 | Laine ...................... H04L 9/008 |
| 2018/0343109 A1 | 11/2018 | Koseki et al. |
| 2019/0260585 A1 | 8/2019 | Kawai et al. |
| 2020/0036511 A1* | 1/2020 | Cheon ................. H04L 63/0428 |
| 2020/0127810 A1* | 4/2020 | Hiromasa ................ G09C 1/00 |
| 2020/0344049 A1* | 10/2020 | Yasuda ................... H04L 9/008 |

FOREIGN PATENT DOCUMENTS

| | | |
|---|---|---|
| JP | 2011-107407 A | 6/2011 |
| JP | 2016-114692 A | 6/2016 |
| JP | 2017-509076 A | 3/2017 |
| WO | 2017/061017 A1 | 4/2017 |
| WO | 2017/126001 A1 | 7/2017 |
| WO | 2017/170780 A1 | 10/2017 |

OTHER PUBLICATIONS

International Search Report for PCT Application No. PCT/JP2019/006969, dated May 21, 2019.
English translation of Written opinion for PCT Application No. PCT/JP2019/006969, dated May 21, 2019.
Taher ElGamal, "A Public Key Cryptosystem and a Signature Scheme Based on Discrete Logarithms", IEEE Transactions on Information Theory 31.4 (1985):469-472, pp. 10-18.
Dan Boneh et al., "Evaluating 2-DNF Formulas on Ciphertexts", Theory of Cryptography Conference, Springer, Berlin, Heidelberg, 2005, pp. 325-341.
Zvika Brakerski et al., "(Leveled) Fully Homomorphic Encryption without Bootstrapping", ACM Transactions on Computation Theory, 6.3 (2014):13, pp. 1-35.

* cited by examiner

ENCRYPTION SYSTEM, KEY GENERATION APPARATUS, KEY GENERATION METHOD, KEY GENERATION PROGRAM, AND HOMOMORPHIC OPERATION APPARATUS

This application is a National Stage Entry of PCT/JP2019/006969 filed on Feb. 25, 2019, the contents of all of which are incorporated herein by reference, in their entirety.

FIELD

The present invention relates to an encryption system, key generation apparatus, key generation method, key generation program, and homomorphic operation apparatus.

BACKGROUND

Biometric authentication is an example of identity authentication. "Biometric authentication" is an identity authentication technique that verifies whether or not a registered individual matches an individual to be authenticated by comparing the biometric information of the registered individual with that of the individual to be authenticated. Here, "biometric information" is data extracted from some characteristics of an individual with respect to his or her body and behavior.

Japan's "Act on the Protection of Personal Information" regards biometric information, with which an individual can be identified, as personal information and states that personal information managed in an electronic database is subject to protection. From this standpoint, when an individual is authenticated in a client-server system, it is preferable to perform authentication without transmitting biometric information from a client to the server. Further, in order to prevent leakage of personal information, biometric information must be encrypted when it is stored on a client.

Further, in addition to identity authentication using biometric information, it is preferable that an authentication system provide all kinds of identity authentication with the same security management as that required by biometric information.

Homomorphic public key encryption schemes is an encryption scheme that satisfies such demands. "Homomorphic public key encryption schemes" means public key encryption schemes with homomorphism, and ciphertext resulting from computation between plaintexts can be calculated from ciphertexts. Simply put, in homomorphic public key encryption schemes, computation performed on ciphertext (homomorphic computation) is maintained even after decryption.

In public key encryption schemes with a multiplicative homomorphism, more complex operations such as constant power can be executed by repeatedly executing operations. In public key encryption schemes with an additive homomorphism, more complex operations such as constant multiplication and inner product can be executed by repeatedly executing operations. Further, with public key encryption schemes with "somewhat homomorphism" or a full homomorphism, operations that combine addition and multiplication in a more complex manner can also be executed. For instance, the following encryption schemes are known as homomorphic public key encryption schemes.

Patent Literature 1 describes public key encryption schemes with an additive homomorphism, known as the "Paillier encryption scheme." Further, Patent Literature 2 describes public key encryption schemes with an additive homomorphism, known as the "Okamoto-Uchiyama encryption scheme."

Non-Patent Literature 1 describes public key encryption schemes with a multiplicative homomorphism, known as the "Elgamal encryption scheme." Further, as public key encryption schemes with an additive homomorphism obtained by modifying Elgamal encryption, "lifted-Elgamal encryption" and the "Elgamal encryption scheme on elliptic curves" are known.

Non-Patent Literature 2 describes public key encryption schemes with somewhat homomorphism, known as the "BGN encryption scheme." In addition, Non-Patent Literature 3 describes public key encryption schemes with somewhat homomorphism, known as "Brakerski-Vaikuntanathan encryption."

For instance, identity authentication using homomorphic public key encryption schemes is executed as follows. First, when a user is registered, authentication information such as a password and his or her biometric information provided by the user is encrypted with an encryption key generated by an authentication server and stored in an authentication terminal used by the user. Then, when authentication is performed, the authentication terminal compares authentication information entered by the user with the encrypted authentication information stored in the terminal and generates an encrypted authentication result. This process is a homomorphic operation using the encryption key and is performed with the authentication information encrypted. Only the encrypted authentication result is transmitted to the authentication server, which is able to obtain the authentication result using a decryption key possessed thereby. In this scheme, the authentication server does not have access to the user's authentication information.

Further, homomorphic public key encryption schemes can be applied to secure computation. For instance, secure computation using homomorphic public key encryption schemes can be executed as follows. First, a data user distributes an encryption key to data providers and a data analyst. The data providers encrypt data using the encryption key and give the encrypted data to the data analyst. The data analyst analyzes the encrypted data by performing a homomorphic operation on a plurality of received ciphertexts using the encryption key and generates the resultant ciphertext. The data user decrypts the analysis result ciphertext received using a decryption key that he or she has and obtains the analysis result. In this scheme, the data user is able to obtain the data analysis result but does not have access to the content of individual pieces of the data.

Patent Literature 3 describes an example of technology that uses homomorphic public key encryption schemes for ciphertext verification. Further, Patent Literature 4 describes an example of a scheme called "homomorphic signature" that uses a homomorphic operation key with stronger authority than a public key (verification key).

[Patent Literature 1] Japanese Patent No. 4137385B2
[Patent Literature 2] Japanese Patent No. 3402441B2
[Patent Literature 3] International Publication Number WO2017/170780
[Patent Literature 4] International Publication Number WO2017/061017
[Non-Patent Literature 1] Taher Elgamal, "A Public Key Cryptosystem and a Signature Scheme Based on Discrete Logarithms," IEEE Transactions on Information Theory 31.4 (1985): 469-472.

[Non-Patent Literature 2] Dan Boneh, Eu-Jin Goh, and Kobbi Nissim, "Evaluating 2-DNF Formulas on Ciphertexts," Theory of Cryptography Conference, Springer, Berlin, Heidelberg, 2005.

[Non-Patent Literature 3] Zvika Brakerski, Craig Gentry, and Vinod Vaikuntanathan, "(Leveled) Fully Homomorphic Encryption without Bootstrapping," ACM Transactions on Computation Theory, 6.3 (2014): 13.

SUMMARY

Each disclosure of Patent Literatures and Non-Patent Literatures cited above is incorporated herein in its entirety by reference thereto. The following analysis is given by the present inventors.

In the homomorphic public key encryption scheme described above, anyone with the encryption key can execute an encryption algorithm and homomorphic operation algorithm. In other words, the authority to execute encryption entails the authority to execute homomorphic operation. As a result, for instance, the following problems may occur.

An identity authentication terminal using homomorphic public key encryption schemes does not perform encryption during authentication but holds an encryption key for homomorphic operation. Therefore, a malicious individual who has got hold of the terminal is able to encrypt his or her authentication information using the encryption key stored in the terminal and also perform a homomorphic operation on the encrypted authentication information. As a result, the malicious individual may succeed in authentication.

Further, a data analyst in secure computation using homomorphic public key encryption schemes does not perform encryption but obtains an encryption key for homomorphic operation. Therefore, a malicious data analyst is able to encrypt arbitrary data instead of the valid data to be encrypted and perform a homomorphic operation on the corrupted data. As a result, a data user may end up with an analysis result corrupted by the malicious data analyst rather than the result of analyzing the valid data from the data provider.

It is an object of the present invention to provide an encryption system, key generation apparatus, key generation method, key generation program, and homomorphic operation apparatus that contribute to achieving homomorphic public key encryption schemes in which one cannot perform encryption with the authority to execute homomorphic operation by separating the authority to execute encryption and the authority to execute homomorphic operation.

According to a first aspect of the present invention, there is provided an encryption system comprising a key generation apparatus that generates an encryption key relating to the authority to generate a ciphertext from a plaintext, a homomorphic operation key relating to the authority to execute a homomorphic operation on a ciphertext that remains encrypted and whose authority is weaker than that of the encryption key, and a decryption key relating to the authority to decrypt ciphertext; an encryption apparatus that generates a ciphertext from a plaintext using the encryption key; a homomorphic operation apparatus that executes a homomorphic operation on the ciphertext using the homomorphic operation key; and a decryption apparatus that decrypts ciphertext using the decryption key.

According to a second aspect of the present invention, there is provided a key generation apparatus generating a pair of an encryption key and a decryption key using a public key encryption scheme; and generating a homomorphic operation key for executing a homomorphic operation on a ciphertext that remains encrypted and is generated using the encryption key by removing an element of the encryption key that is not used for the homomorphic operation.

According to a third aspect of the present invention, there is provided a key generation method including generating a pair of an encryption key and a decryption key using a public key encryption scheme; and generating a homomorphic operation key for executing a homomorphic operation on a ciphertext that remains encrypted and is generated using the encryption key by removing an element of the encryption key that is not used for the homomorphic operation.

According to a fourth aspect of the present invention, there is provided a key generation program executed in a key generation apparatus that generates an encryption key relating to the authority to generate a ciphertext from a plaintext, a homomorphic operation key relating to the authority to execute a homomorphic operation on a ciphertext that remains encrypted, and a decryption key relating to the authority to decrypt ciphertext, the key generation program including generating a pair of the encryption key and the decryption key using a public key encryption scheme; and generating a homomorphic operation key by removing an element of the encryption key that is not used for the homomorphic operation.

Further, this program can be stored in a computer-readable storage medium. The storage medium may be non-transient one such as a semiconductor memory, a hard disk, a magnetic recording medium, an optical recording medium, and the like. The present invention can be realized as a computer program product.

According to a fifth aspect of the present invention, there is provided a homomorphic operation apparatus comprising a ciphertext input part that accepts the input of a ciphertext generated using an encryption key out of a pair of the encryption key and a decryption key generated using a public key encryption scheme; a homomorphic operation key acquisition part that acquires a homomorphic operation key relating to the authority to execute a homomorphic operation on the ciphertext that remains encrypted and whose authority is weaker than that of the encryption key; and a homomorphic operation part that executes the homomorphic operation on the ciphertext that remains encrypted using the homomorphic operation key.

According to each aspect of the present invention, there are provided an encryption system, key generation apparatus, key generation method, key generation program, and homomorphic operation apparatus that contribute to achieving homomorphic public key encryption schemes in which one cannot perform encryption with the authority to execute homomorphic operation by separating the authority to execute encryption and the authority to execute homomorphic operation.

MODES

Modes of the present invention will be described in detail with reference to the drawings. Note that, in each of the drawings and the example embodiments described herein, the same reference signs are given to the same elements and the description thereof will be omitted as appropriate. Further, the following describes the example embodiments using identity authentication and secure computation as examples, however, modes of the present invention are not limited thereto.

First Example Embodiment

Figure 1:
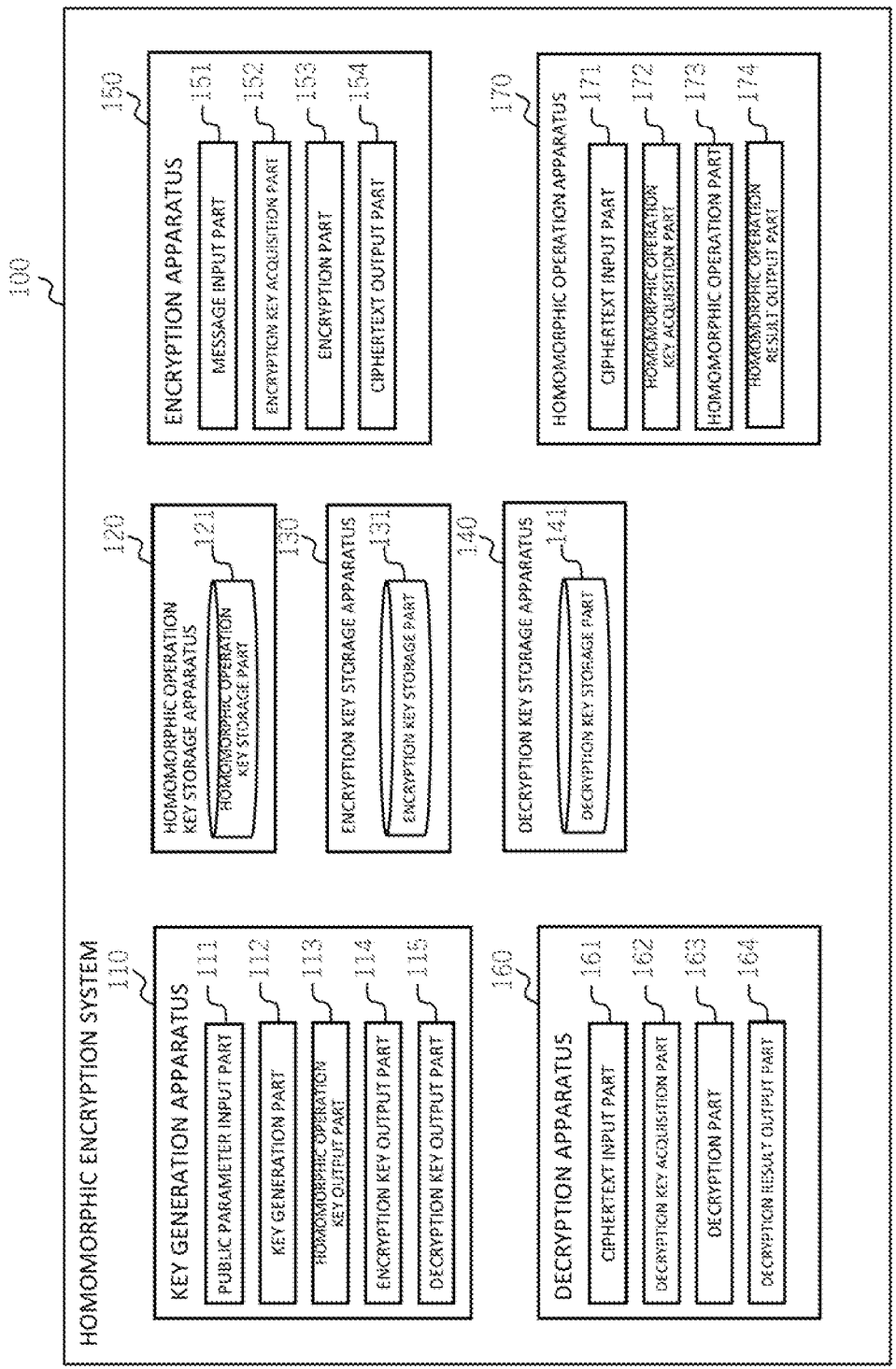
FIG. 1 is a block diagram illustrating the configuration of a homomorphic encryption system relating to a first example embodiment.

FIG. 1 is a block diagram illustrating the configuration of a homomorphic encryption system 100 relating to a first example embodiment. As shown in FIG. 1, the homomorphic encryption system 100 comprises a key generation apparatus 110, a homomorphic operation key storage apparatus 120, an encryption key storage apparatus 130, a decryption key storage apparatus 140, an encryption apparatus 150, a decryption apparatus 160, and a homomorphic operation apparatus 170. Note that each of the apparatuses included in the homomorphic encryption system 100 may be configured as separate apparatuses or implemented in the same apparatus as appropriate according to the application. The homomorphic encryption system 100 may be realized as a server-client system by separately implementing each apparatus as a client or a server.

The key generation apparatus 110 has a public parameter input part 111 that accepts a public parameter input, a key generation part 112 that generates a homomorphic operation key, an encryption key, and a decryption key from the public parameter supplied to the public parameter input part 111, a homomorphic operation key output part 113 that outputs the homomorphic operation key generated by the key generation part 112, an encryption key output part 114 that outputs the encryption key generated by the key generation part 112, and a decryption key output part 115 that outputs the decryption key generated by the key generation part 112.

The homomorphic operation key storage apparatus 120 has a homomorphic operation key storage part 121 that stores the homomorphic operation key outputted by the homomorphic operation key output part 113 of the key generation apparatus 110, the encryption key storage apparatus 130 has an encryption key storage part 131 that stores the encryption key outputted by the encryption key output part 114 of the key generation apparatus 110, and the decryption key storage apparatus 140 has a decryption key storage part 141 that stores the decryption key outputted by the decryption key output part 115 of the key generation apparatus 110.

The encryption apparatus 150 has a message input part 151 that accepts a message input, an encryption key acquisition part 152 that acquires a stored encryption key, an encryption part 153 that generates a ciphertext of the entered message using the encryption key acquired by the encryption key acquisition part 152, and a ciphertext output part 154 that outputs the generated ciphertext. Here, the message is "plaintext" but is not limited to text data, and it may be image or audio data.

The decryption apparatus 160 has a ciphertext input part 161 that accepts a ciphertext input, a decryption key acquisition part 162 that acquires a stored decryption key, a decryption part 163 that decrypts the ciphertext using the decryption key acquired by the decryption key acquisition part 162 and generates a decryption result, and a decryption result output part 164 that outputs the decryption result. Here, the ciphertext supplied to the ciphertext input part 161 is typically output of the encryption apparatus 150 or the homomorphic operation apparatus 170.

The homomorphic operation apparatus 170 has a ciphertext input part 171 that accepts a ciphertext input, a homomorphic operation key acquisition part 172 that acquires a stored homomorphic operation key, a homomorphic operation part 173 that performs a homomorphic operation on the entered ciphertext using the homomorphic operation key acquired by the homomorphic operation key acquisition part 172 and generates a homomorphic operation result, and a homomorphic operation result output part 174 that outputs the homomorphic operation result. Note that the homomorphic operation result outputted by the homomorphic operation result output part 174 is also ciphertext.

Next, with reference to FIGS. 2 and 3, processes performed by the homomorphic encryption system 100 will be described. The processes performed by the homomorphic encryption system 100 can be divided into four categories: a key generation process, an encryption process, a decryption process, and a homomorphic operation process. The following describes an operation example of each process.

Figure 2:
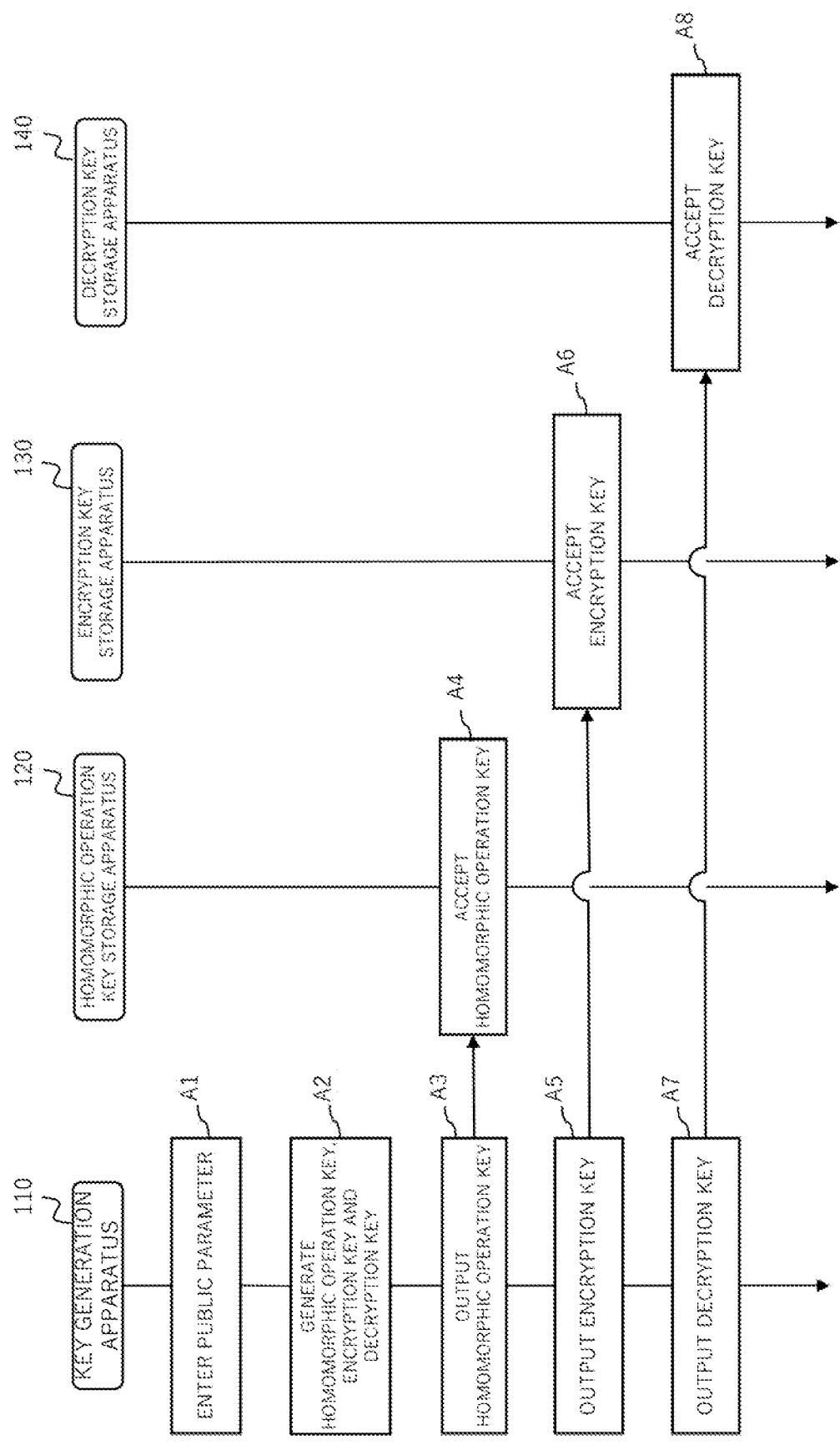
FIG. 2 is a flowchart illustrating a key generation process of the homomorphic encryption system relating to the first example embodiment.

FIG. 2 is a flowchart illustrating the key generation process, which is executed by the key generation apparatus 110, the homomorphic operation key storage apparatus 120, the encryption key storage apparatus 130, and the decryption key storage apparatus 140 as follows.

First, a public parameter is supplied to the public parameter input part 111 of the key generation apparatus 110 (step A1).

Next, the key generation part 112 of the key generation apparatus 110 generates a homomorphic operation key, an encryption key, and a decryption key on the basis of the public parameter (step A2).

Next, the homomorphic operation key output part 113 of the key generation apparatus 110 outputs the homomorphic operation key generated in the step A2 (step A3). The outputted homomorphic operation key is stored in the homomorphic operation key storage part 121 of the homomorphic operation key storage apparatus 120 (step A4).

Then, the encryption key output part 114 of the key generation apparatus 110 outputs the encryption key generated in the step A2 (step A5). The outputted encryption key is stored in the encryption key storage part 131 of the encryption key storage apparatus 130 (step A6).

Finally, the decryption key output part 115 of the key generation apparatus 110 outputs the decryption key generated in the step A2 (step A7). The outputted decryption key is stored in the decryption key storage part 141 of the decryption key storage apparatus 140 (step A8).

It should be noted that the procedure described above is merely an example. For instance, the order of the steps A3, A5, and A7, in which the keys are outputted, can be changed.

Figure 3:
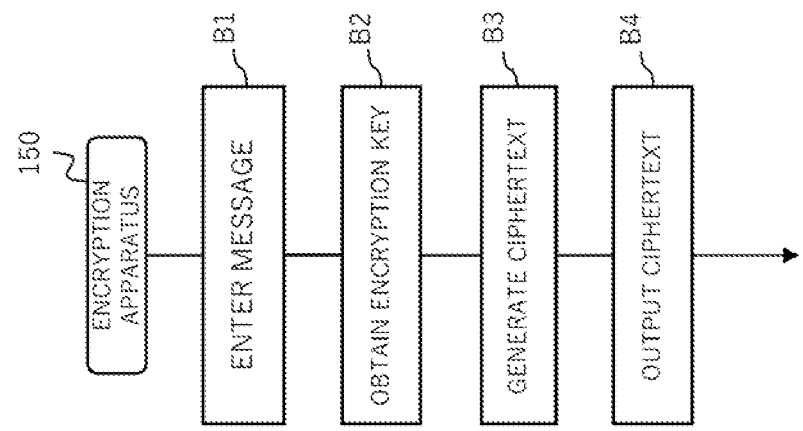
FIG. 3 is a flowchart illustrating an encryption process of the homomorphic encryption system relating to the first example embodiment.

FIG. 3 is a flowchart illustrating the encryption process, which is executed by the encryption apparatus 150 as follows.

First, the message input part 151 accepts a message to be encrypted (step B1). As stated above, the message here is not limited to text data.

Next, the encryption key acquisition part 152 acquires the encryption key stored in the encryption key storage part 131 of the encryption key storage apparatus 130 (step B2).

Then, the encryption part 153 encrypts the message received in the step B1 using the encryption key acquired in the step B2 and generates a ciphertext (step B3).

Finally, the ciphertext output part 154 outputs the ciphertext generated in the step B3 (step B4).

Note that the procedure described above is merely an example. For instance, the step B2 may be executed before the step B1.

Figure 4:
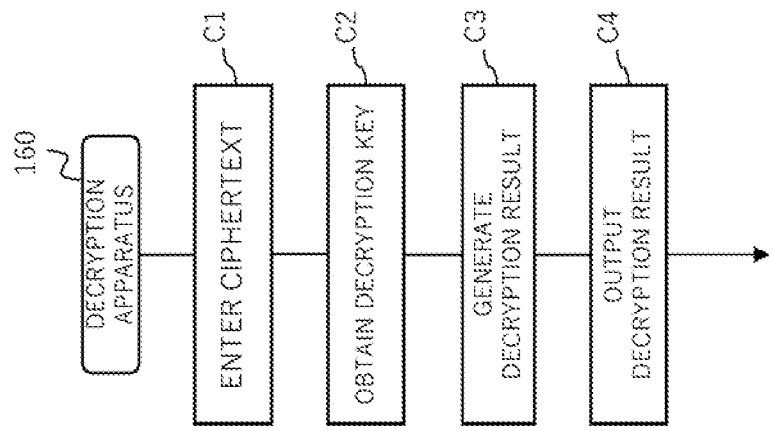
FIG. 4 is a flowchart illustrating a decryption process of the homomorphic encryption system relating to the first example embodiment.

FIG. 4 is a flowchart illustrating the decryption process, which is executed by the decryption apparatus 160 as follows.

First, the ciphertext input part 161 accepts a ciphertext to be decrypted (step C1).

Next, the decryption key acquisition part 162 acquires the decryption key stored in the decryption key storage part 141 of the decryption key storage apparatus 140 (step C2).

Then, the decryption part 163 decrypts the ciphertext received in the step C1 using the decryption key acquired in the step C2 and generates a decryption result (step C3).

Finally, the decryption result output part 164 outputs the decryption result generated in the step C3 (step C4).

Note that the procedure described above is merely an example. For instance, the step C2 may be executed before the step C1.

Figure 5:
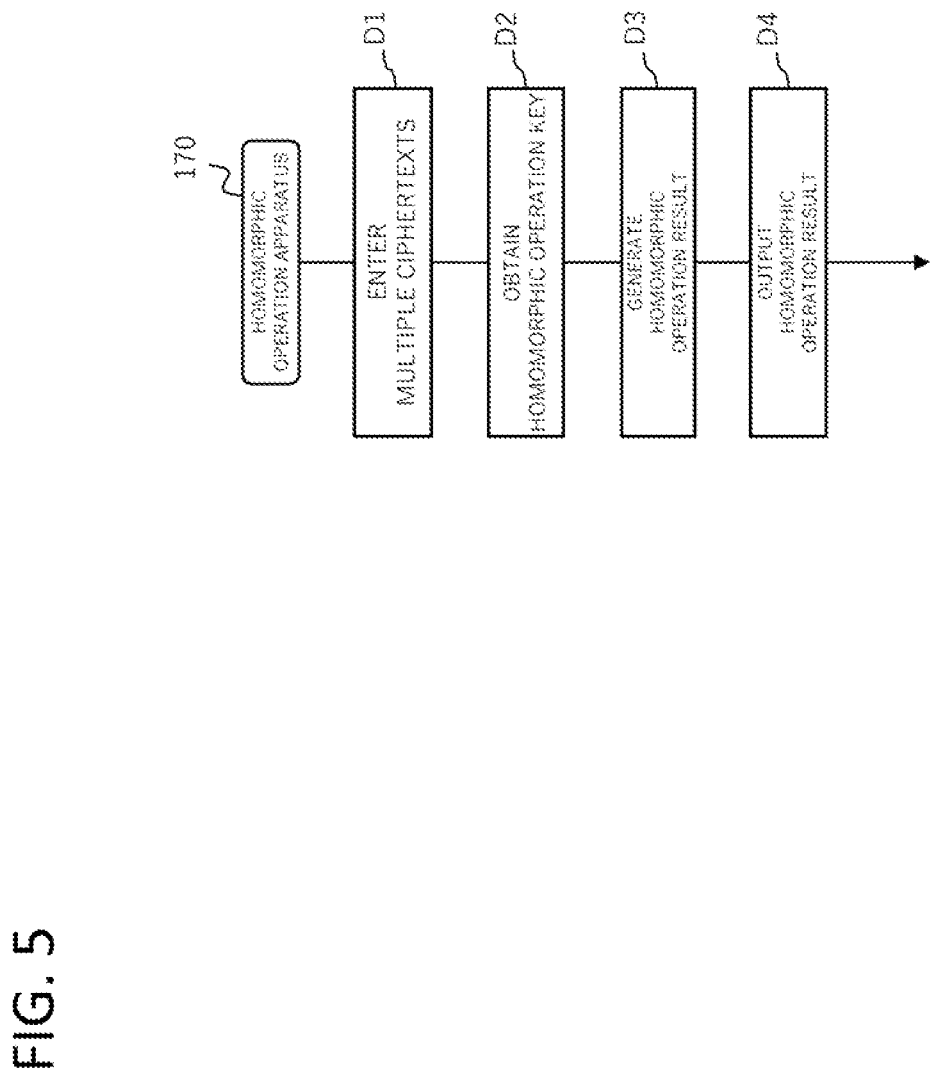
FIG. 5 is a flowchart illustrating a homomorphic operation process of the homomorphic encryption system relating to the first example embodiment.

FIG. 5 is a flowchart illustrating the homomorphic operation process, which is executed by the homomorphic operation apparatus 170 as follows.

First, the ciphertext input part 171 accepts a plurality of ciphertexts on which a homomorphic operation is performed (step D1).

Next, the homomorphic operation key acquisition part 172 acquires the homomorphic operation key stored in the homomorphic operation key storage part 121 of the homomorphic operation key storage apparatus 120 (step D2).

Then, the homomorphic operation part 173 performs a homomorphic operation on the plurality of ciphertexts received in the step D1 using the homomorphic operation key acquired in the step D2 and generates a homomorphic operation result (step D3).

Finally, the homomorphic operation result output part 174 outputs the homomorphic operation result generated in the step D3 (step D4).

Note that the procedure described above is merely an example. For instance, the step D2 may be executed before the step D1.

Example 1 Relating to the First Example Embodiment

Next, a processing example of the homomorphic encryption system 100 relating to the present example embodiment based on lifted-Elgamal encryption scheme will be described. Lifted-Elgamal encryption scheme is an example of public key encryption schemes with an additive homomorphism. The following first describes homomorphic public key encryption schemes and lifted-Elgamal encryption scheme, and then discusses the processing example of the homomorphic encryption system 100 relating to the present example embodiment.

(Homomorphic Public Key Encryption Scheme)

A public key encryption scheme is constituted by three algorithms: a key generation algorithm (KeyGen), an encryption algorithm (Enc), and a decryption algorithm (Dec).

The key generation algorithm generates an encryption key ek and a decryption key dk using a parameter called a security parameter that indicates the strength of a key. This operation can be expressed by the following formula, where the security parameter is $\kappa$.

$$KeyGen(\kappa) \rightarrow (ek, dk)$$

The encryption algorithm generates a ciphertext c, which is the result of encrypting a plaintext message m using the encryption key ek. This can be expressed by the following formula.

$$Enc(ek, m) \rightarrow c$$

The decryption algorithm generates m', which is the result of decrypting the ciphertext c using the decryption key dk. This can be expressed by the following formula.

$$Dec(dk, c) \rightarrow m'$$

A public key encryption scheme needs to be able to decrypt ciphertext correctly. In other words, for an arbitrary pair of the encryption key ek and the decryption key dk generated by the key generation algorithm, m' obtained by decrypting with the decryption key dk the ciphertext c, which is the result of encrypting an arbitrary message m using the encryption key ek, should be equal to m. That is to say, for KeyGen $(\kappa) \rightarrow (ek, dk)$ and an arbitrary message m, $$Dec(dk, Enc(ek, m)) \rightarrow m$$

should hold.

In a public key encryption scheme, anyone with the encryption key can execute the encryption algorithm but cannot execute the decryption algorithm without the decryption key.

A homomorphic public key encryption scheme has a homomorphic operation algorithm (Hom) in addition to the algorithms in public key encryption schemes.

The homomorphic operation algorithm uses the encryption key to generate a ciphertext, which is the result of performing an operation on messages corresponding to a plurality of input ciphertexts. When two messages can be accepted as input, this is expressed by the following formula.

$$Hom(ek, c_1, c_2) \rightarrow c$$

Note that there are schemes in which the homomorphic operation algorithm can accept three or more ciphertexts or both a ciphertext and plaintext. Further, in a scheme that can execute homomorphic operations corresponding to a plurality of types of operations, one sometimes specifies an operation to be executed when executing the homomorphic operation algorithm.

For instance, in a case of public key encryption schemes with an additive homomorphism, a ciphertext c generated from a ciphertext $c_1$ obtained by encrypting a message $m_1$ using an encryption key ek and a ciphertext $c_2$ obtained by encrypting a message $m_2$ using the encryption key ek is a ciphertext of the sum of the two messages ($m_1 + m_2$). In other words, for KeyGen $(\kappa) \rightarrow (ek, dk)$ and arbitrary messages $m_1$ and $m_2$, when $$Enc(ek, m_1) \rightarrow c_1, Enc(ek, m_2) \rightarrow c_2,$$

$$Dec(dk, Hom(ek, c_1, c_2)) \rightarrow m_1 + m_2$$

should hold.

Further, for instance, in a case of public key encryption schemes with a multiplicative homomorphism, a ciphertext c generated from a ciphertext $c_1$ obtained by encrypting a message $m_1$ using an encryption key ek and a ciphertext $c_2$ obtained by encrypting a message $m_2$ using the encryption key ek should be a ciphertext of the product of the two messages ($m_1 \cdot m_2$). In other words, for KeyGen $(\kappa) \rightarrow (ek, dk)$ and arbitrary messages $m_1$ and $m_2$, when $$Enc(ek, m_1) \rightarrow c_1, Enc(ek, m_2) \rightarrow c_2,$$

$$Dec(dk, Hom(ek, c_1, c_2)) \rightarrow m_1 \cdot m_2$$

should hold.

(Lifted-Elgamal Encryption Scheme)

Lifted-Elgamal encryption scheme is an example of public key encryption schemes with an additive homomorphism. Each algorithm of lifted-Elgamal encryption operates as follows.

First, the key generation algorithm accepts the security parameter $\kappa$ as input. Next, a $\kappa$-bit prime number q is randomly selected and a multiplicative group G of order q and its generator g are selected. Then, an integer x equal to or greater than 1 and less than q is selected uniformly at random and $h := g^x$ is set. Finally, an encryption key $ek = (\kappa, q, G, g, h)$ and a decryption key $dk = (ek, x)$ are outputted.

The encryption algorithm first accepts the encryption key $ek = (\kappa, q, G, g, h)$ and a message m as input. Next, an integer r equal to or greater than 1 and less than q is selected uniformly at random, and $c_a = g^r$, $c_b = g^m \cdot h^r$ are set. Finally, a ciphertext $c = (c_a, c_b)$ is outputted.

The decryption algorithm first accepts the decryption key $dk = (ek, x)$ and the ciphertext $c = (c_a, c_b)$ as input. Next, $M' = c_b/((c_a)^x)$ is computed. Finally, a decryption result $m' = D\log_g(M')$ is outputted. Note that D log is a function where $D\log_g(g^x) = x$.

The equations below can confirm that the ciphertext $c = (c_a, c_b) = (g^r, g^m \cdot h^r)$ of the message m can be correctly decrypted to m by the decryption algorithm of lifted-Elgamal encryption scheme.

$$M' = c_b/(c_a)^x = (g^m \cdot h^r)/(g^r)^x = (g^m \cdot g^{xr})/(g^r)^x = g^m$$

$$m' = D\log_g(g^m) = m$$

The homomorphic operation algorithm first accepts the encryption key $ek = (\kappa, q, G, g, h)$ and first and second ciphertexts $c_1 = (c_{1,a}, c_{1,b})$ and $c_2 = (c_{2,a}, c_{2,b})$ as input. Next, $c_a = c_{1,a} \cdot c_{2,a}$ and $c_b = c_{1,b} \cdot c_{2,b}$ are computed. Finally, a homomorphic operation result $c = (c_a, c_b)$ is outputted.

For the ciphertext of a message $m_1$ ($c_{1,a} = g^r$, $c_{1,b} = g^{m_1} \cdot h^r$) (where $g^{m_1}$ denotes g raised to the power of $m_1$) and the ciphertext of a message $m_2$ ($c_{2,a} = g^s$, $c_{2,b} = g^{m_2} \cdot h^s$) (where $g^{m_2}$ denotes g raised to the power of $m_2$), the following two equations hold.

$$c_a = g^{(r+s)}$$

$c_b = g^{(m_1+m_2)} \cdot h^{(r+s)}$ (where $g^{(m_1+m_2)}$ denotes g raised to the power of $m_1 + m_2$.)

Therefore, c is a ciphertext of $m_1 + m_2$, and lifted-Elgamal encryption scheme has an additive homomorphism.

Present Example

Example 1 relating to the first example embodiment is based on lifted-Elgamal encryption scheme to which the following modification is made. An example executed by the homomorphic encryption system 100 will be described below with reference to the reference signs in FIGS. 1 to 5.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter $\kappa$ (the step A1).

Next, the key generation part 112 of the key generation apparatus 110 randomly selects a $\kappa$-bit prime number q and selects a multiplicative group G of order q and its generator g. Then, an integer x equal to or greater than 1 and less than q is selected uniformly at random and $h := g^x$ is set.

Next, the key generation part 112 generates a homomorphic operation key, in addition to encryption and decryption keys. More specifically, the homomorphic operation key is $hk = (\kappa, q, G)$, the encryption key is $ek = (\kappa, q, G, g, h)$, and the decryption key is $dk = (ek, x)$ (the step A2).

Then, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key $ek = (\kappa, q, G, g, h)$ stored in the encryption key storage part 131 of the encryption key storage apparatus 130 (the step B2).

Next, the encryption part 153 selects uniformly at random an integer r equal to or greater than 1 and less than q, and computes $c_a = g^r$, $c_b = g^m \cdot h^r$ (the step B3).

Finally, the ciphertext output part 154 outputs $(c_a, c_b)$ generated in the step B3 as a ciphertext (the step B4).

The decryption apparatus 160 performs the following steps.

First, the ciphertext input part 161 accepts the ciphertext $c=(c_a, c_b)$ to be decrypted (the step C1).

Next, the decryption key acquisition part 162 acquires the decryption key $dk=(\kappa, q, G, g, h, x)$ stored in the decryption key storage part 141 of the decryption key storage apparatus 140 (the step C2).

Then, the decryption part 163 computes $M'=c_b/((c_a)^x)$. Moreover, the decryption part 163 computes $m'=D\log_g(M')$ (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1=(c_{1,a}, c_{1,b})$ and $c_2=(c_{2,a}, c_{2,b})$ on which a homomorphic operation is performed (the step D1).

Next, the homomorphic operation key acquisition part 172 acquires the homomorphic operation key $hk=(\kappa, q, G)$ stored in the homomorphic operation key storage part 121 of the homomorphic operation key storage apparatus 120 (the step D2).

Then, the homomorphic operation part 173 computes $c_a=c_{1,a} \cdot c_{2,a}$ and $c_b=c_{1,b} \cdot c_{2,b}$ (the step D3).

Finally, the homomorphic operation result output part 174 outputs the homomorphic operation result $c=(c_a, c_b)$ generated in the step D3 (the step D4).

As described above, the encryption key $ek=(\kappa, q, G, g, h)$ and the homomorphic operation key $hk=(\kappa, q, G)$ are different. Further, while g and h are required to compute $c_a=g^r$, $c_b=g^m \cdot h^r$ in the encryption process, the homomorphic operation key $hk=(\kappa, q, G)$ does not include g and h. Therefore, one is unable to execute encryption with the homomorphic operation key $hk=(\kappa, q, G)$. In the present example, the authority to execute encryption is different from the authority to execute homomorphic operation, and the authority of the homomorphic operation key is weaker than that of the encryption key. In other words, encryption cannot be executed with the authority to execute homomorphic operation.

Further, as demonstrated by the methods for generating the encryption key $ek=(\kappa, q, G, g, h)$ and the homomorphic operation key $hk=(\kappa, q, G)$, one can obtain the homomorphic operation key $hk=(\kappa, q, G)$ by removing the elements g and h, unused in the homomorphic operation, from the elements of the encryption key $ek=(\kappa, q, G, g, h)$.

Example 2 Relating to the First Example Embodiment

Next, a processing example of the homomorphic encryption system 100 relating to the present example embodiment based on the Paillier encryption scheme will be described. The Paillier encryption scheme is an example of public key encryption schemes with an additive homomorphism. The following first describes the Paillier encryption scheme and then discusses the processing example of the homomorphic encryption system 100 relating to the present example embodiment. Note that, since the matters with respect to homomorphic public key encryption schemes are the same as those in Example 1, the description thereof will be omitted.

(Paillier Encryption Scheme)

The Paillier encryption scheme is an example of public key encryption schemes with an additive homomorphism. Each algorithm of the Paillier encryption scheme operates as follows.

First, the key generation algorithm accepts the security parameter $\kappa$ as input. Next, two $\kappa$-bit prime numbers p and q are randomly selected (n=pq). Then, an integer k between 1 and n inclusive is randomly selected and let $g=1+kn \mod n^2$. Finally, an encryption key $ek=(\kappa, n, g)$ and a decryption key $dk=(ek, p, q)$ are outputted.

The encryption algorithm first accepts the encryption key $ek=(\kappa, n, g)$ and a message m as input. Next, an integer r less than $n^2$ is selected uniformly at random and let $c=g^m \cdot r^n \mod n^2$. Finally, the ciphertext c is outputted.

The decryption algorithm first accepts the decryption key $dk=(ek, p, q)$ and the ciphertext c as input. Next, let $\lambda$ be the least common multiple of p−1 and q−1. Then, let $c_\lambda=c^\lambda \mod n^2$ and $c_L=(c_\lambda-1)/n$. Next, let $g_\lambda=g^\lambda \mod n^2$ and $g_L=(g_\lambda-1)/n$. Finally, a decryption result $m'=c_L/g_L \mod n$ is outputted.

By utilizing the fact that, for an arbitrary integer h, $h^{n\lambda} \mod n^2=1$ holds, the equations below can confirm that the ciphertext $c=g^m \cdot r^n \mod n^2$ of the message m can be correctly decrypted to m by the decryption algorithm of the Paillier encryption scheme.

$$c_\lambda=c^\lambda \mod n^2=(g^m \cdot r^n)^\lambda \mod n^2=g^{m\lambda} \cdot r^{n\lambda} \mod n^2=g^{m\lambda} \mod n^2=(1+kn)^{m\lambda} \mod n^2=1+n(km\lambda \mod n)$$

$$c_L=(c_\lambda-1)/n=km\lambda \mod n$$

$$g_\lambda=g^\lambda \mod n^2=g^\lambda \mod n^2=(1+kn)^\lambda \mod n^2=1+n(k\lambda \mod n)$$

$$g_L=(g_\lambda-1)/n=k\lambda \mod n$$

$$m'=c_\lambda/g_\lambda \mod n=km\lambda/k\lambda \mod n=m$$

The homomorphic operation algorithm first accepts the encryption key $ek=(\kappa, n, g)$ and first and second ciphertexts $c_1$ and $c_2$ as input. Next, $c=c_1 \cdot c_2 \mod n^2$ is computed. Finally, the homomorphic operation result c is outputted.

For the ciphertext $c_1=g^{m1} \cdot r^n \mod n^2$ (where $g^{m1}$ denotes g raised to the power of $m_1$) of a message $m_1$ and the ciphertext $c_2=g^{m2} \cdot s^n \mod n^2$ (where $g^{m2}$ denotes g raised to the power of $m_2$) of a message $m_2$, the following equation holds.

$$c=g^{(m1+m2)} \cdot (r \cdot s)^n \mod n^2 \text{ (where } g^{(m1+m2)} \text{ denotes } g \text{ raised to the power of } m_1+m_2.)$$

Therefore, c is a ciphertext of $m_1+m_2$, and the Paillier encryption scheme has an additive homomorphism.

Present Example

Example 2 relating to the first example embodiment is based on the Paillier encryption scheme to which the following modification is made. An example executed by the homomorphic encryption system 100 will be described below with reference to the reference signs in FIGS. 1 to 5.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter $\kappa$ (the step A1).

Next, the key generation part 112 of the key generation apparatus 110 randomly selects two $\kappa$-bit prime numbers p and q and sets n=pq. Then, an integer k between 1 and n inclusive is randomly selected and let $g=1+kn \mod n^2$.

Next, the key generation part 112 generates a homomorphic operation key, in addition to encryption and decryption keys. More specifically, the homomorphic operation key is $hk=(\kappa, n)$, the encryption key is $ek=(\kappa, n, g)$, and the decryption key is $dk=(ek, p, q)$ (the step A2).

Then, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key $ek=(\kappa, n, g)$ stored in the encryption key storage part 131 of the encryption key storage apparatus 130 (the step B2).

Next, an integer r between 1 and $n^2$ inclusive is randomly selected and $c=g^m \cdot r^n \mod n^2$ is computed (the step B3).

Finally, the ciphertext output part 154 outputs the ciphertext c generated in the step B3 (the step B4).

The decryption apparatus 160 performs the following steps.

First, the ciphertext input part 161 accepts the ciphertext c to be decrypted (the step C1).

Next, the decryption key acquisition part 162 acquires the decryption key $dk=(\kappa, n, g, p, q)$ stored in the decryption key storage part 141 of the decryption key storage apparatus 140 (the step C2).

Next, the decryption part 163 sets $\lambda$ as the least common multiple of $p-1$ and $q-1$. Then, the decryption part 163 computes $c_\lambda = c^\lambda \mod n^2$ from the ciphertext c received in the step C1 and also computes $c_L=(c_\lambda-1)/n$. Next, the decryption part 163 computes $g_\lambda = g^\lambda \mod n^2$ from the decryption key dk obtained in the step C2 and also computes $g_L=(g_\lambda-1)/n$. Then, the decryption part 163 computes $m'=cL/gL \mod n$ (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1$ and $c_2$ on which a homomorphic operation is performed (the step D1).

Next, the homomorphic operation key acquisition part 172 acquires the homomorphic operation key $hk=(\kappa, n)$ stored in the homomorphic operation key storage part 121 of the homomorphic operation key storage apparatus 120 (the step D2).

Then, the homomorphic operation part 173 computes $c=c_1 \cdot c_2 \mod n^2$ (the step D3).

Finally, the homomorphic operation result output part 174 outputs the homomorphic operation result c generated in the step D3 (the step D4).

As described above, the encryption key $ek=(\kappa, n, g)$ and the homomorphic operation key $hk=(\kappa, n)$ are different.

Further, while g is required to compute $c=g^m \cdot r^n \mod n^2$ in the encryption process, the homomorphic operation key $hk=(\kappa, n)$ does not include g. Therefore, one is unable to execute encryption with the homomorphic operation key $hk=(\kappa, n)$. In the present example, the authority to execute encryption is different from the authority to execute homomorphic operation, and the authority of the homomorphic operation key is weaker than that of the encryption key. In other words, encryption cannot be executed with the authority to execute homomorphic operation.

Further, as demonstrated by the methods for generating the encryption key $ek=(\kappa, n, g)$ and the homomorphic operation key $hk=(\kappa, n)$, one can obtain the homomorphic operation key $hk=(\kappa, n)$ by removing the element g, unused in the homomorphic operation, from the elements of the encryption key $ek=(\kappa, n, g)$.

Example 3 Relating to the First Example Embodiment

Next, a processing example of the homomorphic encryption system 100 relating to the present example embodiment based on the Okamoto-Uchiyama encryption scheme will be described. The Okamoto-Uchiyama encryption scheme is an example of public key encryption schemes with an additive homomorphism. The following first describes the Okamoto-Uchiyama encryption scheme and then discusses the processing example of the homomorphic encryption system 100 relating to the present example embodiment. Note that, since the matters with respect to homomorphic public key encryption schemes are the same as those in Example 1, the description thereof will be omitted.

(Okamoto-Uchiyama Encryption Scheme)

The Okamoto-Uchiyama encryption scheme is an example of public key encryption schemes with an additive homomorphism. Each algorithm of the Okamoto-Uchiyama encryption scheme operates as follows.

(Okamoto-Uchiyama Encryption Scheme)

First, the key generation algorithm accepts the security parameter $\kappa$ as input. Next, two $\kappa$-bit prime numbers p and q are randomly selected ($n=p^2 q$). Next, an integer g that is between 1 and n inclusive and is prime to n (i.e., the greatest common divisor of g and n is 1) is randomly selected. If $g^{p-1} \mod p^2 = 1$, g is reselected. Then, $h=g^n \mod n$ is computed. Finally, an encryption key $ek=(\kappa, n, g, h)$ and a decryption key $dk=(ek, p, q)$ are outputted.

The encryption algorithm first accepts the encryption key $ek=(\kappa, n, g, h)$ and a message m as input. Next, an integer r less than n is selected uniformly at random and let $c=g^m \cdot h^r \mod n$. Finally, the ciphertext c is outputted.

The decryption algorithm first accepts the decryption key $dk=(ek, p, q)$ and the ciphertext c as input. Next, let $c_p=c^{p-1} \mod p^2$ and $c_L=(c_p-1)/p$. Then, let $g_p=g^{p-1} \mod p^2$ and $g_L=(g_p-1)/p$. Finally, a decryption result $m'=c_L/g_L \mod p$ is outputted.

By utilizing the fact that, for an arbitrary integer h, $h^{pq(p-1)} \mod n = 1$ holds and that, using a certain integer k, $h^{p-1}=1+kp$ holds, the equations below can confirm that the ciphertext $c=g^m \cdot h^r \mod n$ of the message m can be correctly decrypted to m by the decryption algorithm of the Paillier encryption scheme.

$$c_p = c^{p-1} \mod p^2 = (g^m \cdot h^r)^{p-1} \mod p^2 = g^{m(p-1)} \cdot g^{rn(p-1)} \mod p^2 = g^{m(p-1)} \mod p^2 = (1+kp)^m \mod p^2 = 1+p(km \mod p)$$

$$c_L = (c_p-1)/p = km \mod p$$

$$g_p = g^{p-1} \mod p^2 = (1+kp) \mod p^2 = 1+p(k \mod p)$$

$g_L = (g_P - 1)/p = k \mod p$ $m' = c_L/g_L \mod p = km/k \mod p = m$

The homomorphic operation algorithm first accepts the encryption key $ek=(\kappa, n, g, h)$ and first and second ciphertexts $c_1$ and $c_2$ as input. Next, $c = c_1 \cdot c_2 \mod n$ is computed. Finally, the homomorphic operation result c is outputted.

For the ciphertext $c_1 = g^{m1} \cdot h^r \mod n$ (where $g^{m1}$ denotes g raised to the power of $m_1$) of a message $m_1$ and the ciphertext $c_2 = g^{m2} \cdot h^s \mod n$ (where $g^{m2}$ denotes g raised to the power of $m_2$) of a message $m_2$, the following equation holds.

$c = g^{(m1+m2)} \cdot h^{(r+s)} \mod n$ (where $g^{(m1+m2)}$ denotes g raised to the power of $m_1 + m_2$.)

Therefore, c is a ciphertext of $m_1 + m_2$, and the Okamoto-Uchiyama encryption scheme has an additive homomorphism.

Present Example

Example 3 relating to the first example embodiment is based on the Okamoto-Uchiyama encryption scheme to which the following modification is made. An example executed by the homomorphic encryption system 100 will be described below with reference to the reference signs in FIGS. 1 to 5.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter $\kappa$ (the step A1).

Next, the key generation part 112 generates a homomorphic operation key, in addition to encryption and decryption keys. More specifically, the key generation part 112 of the key generation apparatus 110 randomly selects two $\kappa$-bit prime numbers p and q and sets $n = p^2 q$. Then, an integer g that is between 1 and n inclusive and is prime to n (i.e., the greatest common divisor of g and n is 1) is randomly selected. If $g^{p-1} \mod p^2 = 1$, g is reselected. Next, $h = g^n \mod n$ is computed. Then, a homomorphic operation key $hk=(\kappa, n)$, an encryption key $ek=(\kappa, n, g, h)$ and a decryption key $dk=(ek, p, q)$ are generated (the step A2).

Next, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key $ek=(\kappa, n, g, h)$ stored in the encryption key storage part 131 of the encryption key storage apparatus 130 (the step B2).

Next, encryption part 153 selects uniformly at random an integer r less than n and computes $c = g^m \cdot h^r \mod n$ (the step B3).

Finally, the ciphertext output part 154 outputs the ciphertext c generated in the step B3 (the step B4).

The decryption apparatus 160 performs the following steps.

First, the ciphertext input part 161 accepts the ciphertext c to be decrypted (the step C1).

Next, the decryption key acquisition part 162 acquires the decryption key $dk=(\kappa, n, g, h, p, q)$ stored in the decryption key storage part 141 of the decryption key storage apparatus 140 (the step C2).

Then, the decryption part 163 computes $c_p = c^{p-1} \mod p^2$ and also computes $c_L = (c_p - 1)/p$. Next, $g_p = g^{p-1} \mod p^2$ is computed and $g_L = (g_{p-1})/p$ is also computed. Then, $m' = c_L/g_L \mod p$ is computed (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1$ and $c_2$ on which a homomorphic operation is performed (the step D1).

Next, the homomorphic operation key acquisition part 172 acquires the homomorphic operation key $hk=(\kappa, n)$ stored in the homomorphic operation key storage part 121 of the homomorphic operation key storage apparatus 120 (the step D2).

Then, the homomorphic operation part 173 computes $c = c_1 \cdot c_2 \mod n$ (the step D3).

Finally, the homomorphic operation result output part 174 outputs the homomorphic operation result c generated in the step D3 (the step D4).

As described above, the encryption key $ek=(\kappa, n, g, h)$ and the homomorphic operation key $hk=(\kappa, n)$ are different. Further, while g and h are required to compute $c = g^m \cdot h^r \mod n$ in the encryption process, the homomorphic operation key $hk=(\kappa, n)$ does not include g and h. Therefore, one is unable to execute encryption with the homomorphic operation key $hk=(\kappa, n)$. In the present example, the authority to execute encryption is different from the authority to execute homomorphic operation, and the authority of the homomorphic operation key is weaker than that of the encryption key. In other words, encryption cannot be executed with the authority to execute homomorphic operation.

Further, as demonstrated by the methods for generating the encryption key $ek=(\kappa, n, g, h)$ and the homomorphic operation key $hk=(\kappa, n)$, one can obtain the homomorphic operation key $hk=(\kappa, n)$ by removing the elements g and h, unused in the homomorphic operation, from the elements of the encryption key $ek=(\kappa, n, g, h)$.

Second Example Embodiment

Figure 6:
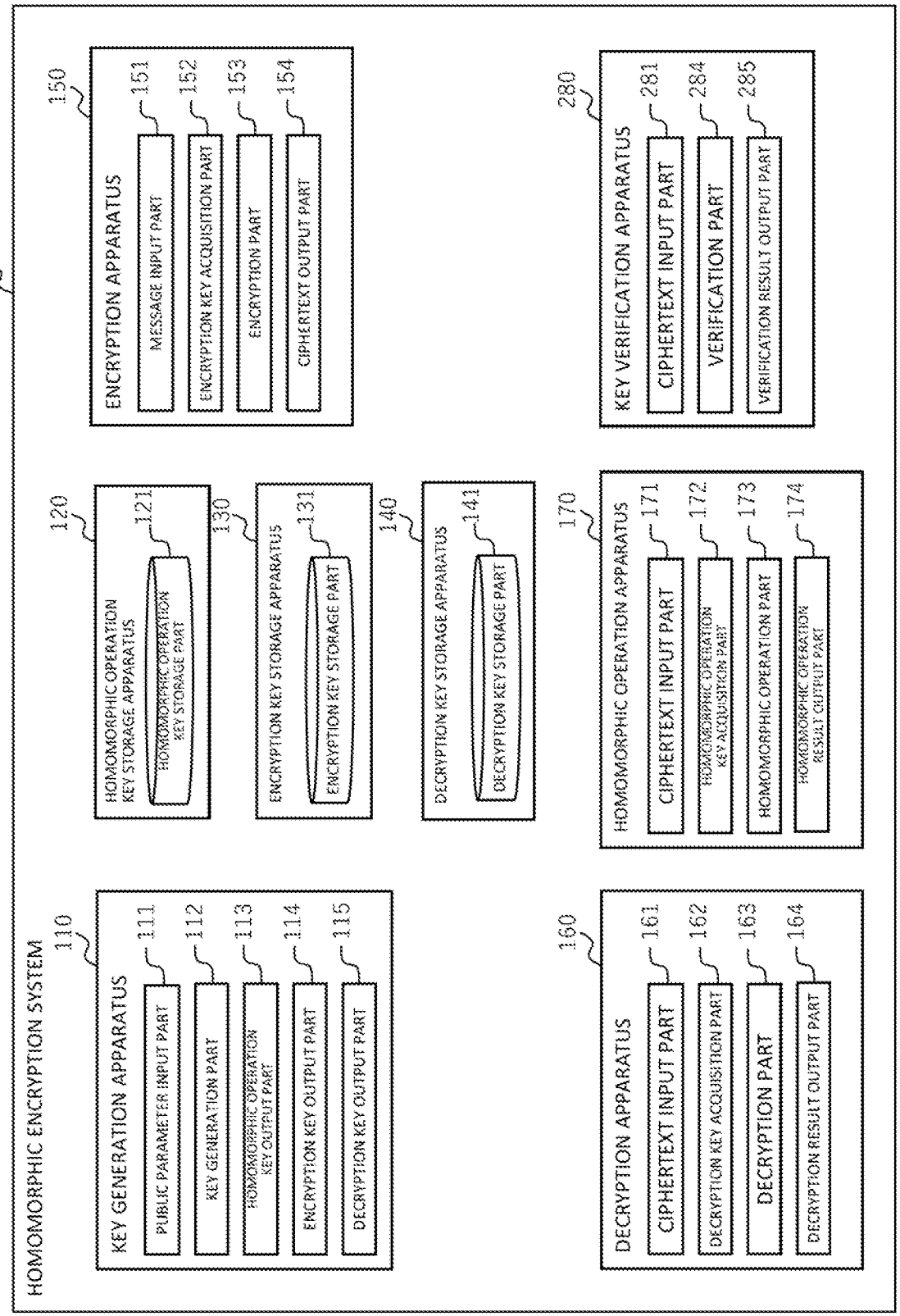
FIG. 6 is a block diagram illustrating the configuration of a homomorphic encryption system relating to a second example embodiment.

FIG. 6 is a block diagram illustrating the configuration of a homomorphic encryption system 200 relating to a second example embodiment. As shown in FIG. 6, the homomorphic encryption system 200 comprises a key verification apparatus 280 in addition to the configuration of the homomorphic encryption system 100 relating to the first example embodiment. Therefore, the following will not describe the configurations of the key generation apparatus 110, the homomorphic operation key storage apparatus 120, the encryption key storage apparatus 130, the decryption key storage apparatus 140, the encryption apparatus 150, the decryption apparatus 160, and the homomorphic operation apparatus 170.

The key verification apparatus 280 has a ciphertext input part 281 that accepts a ciphertext input, a verification part 284 that generates a result of verifying if the ciphertext input is a ciphertext generated using an encryption key generated by the key generation apparatus 110, and a verification result output part 285 that outputs the verification result.

Figure 7:
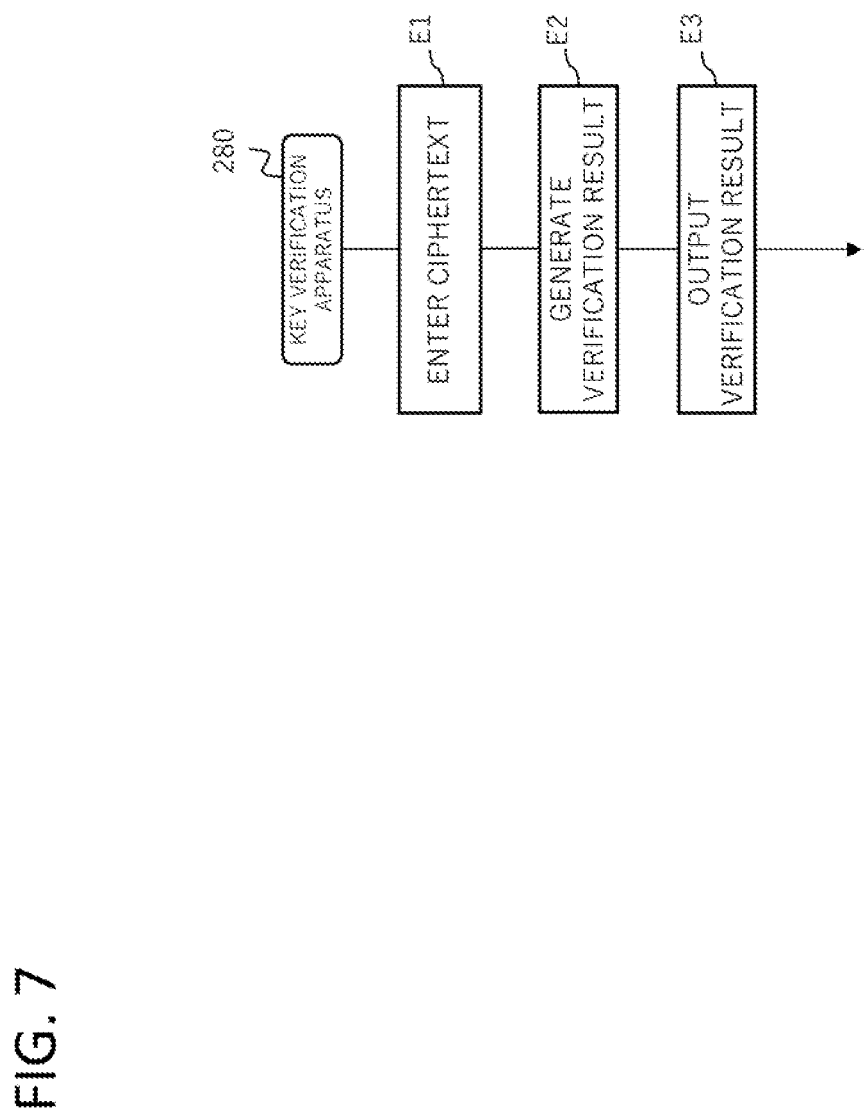
FIG. 7 is a flowchart illustrating a key verification process of the homomorphic encryption system relating to the second example embodiment.

The key verification apparatus 280 executes a key verification process as follows. FIG. 7 is a flowchart illustrating the key verification process.

First, the ciphertext input part 281 accepts a ciphertext to be verified (step E1).

Next, the verification part 284 verifies if the ciphertext received in the step E1 is a ciphertext generated using the encryption key generated in the step A2 and generates a verification result (step E2).

Finally, the verification result output part 285 outputs the verification result generated in the step E2 (step E3).

Note that the procedure described above is merely an example. For instance, the step E2 may be executed before the step E1.

Example 1 Relating to the Second Example Embodiment

Next, a processing example of the homomorphic encryption system 200 relating to the present example embodiment based on Elgamal encryption scheme will be described. Elgamal encryption scheme is an example of public key encryption schemes with a multiplicative homomorphism. The following first describes Elgamal encryption scheme, and then discusses the processing example of the homomorphic encryption system 200 relating to the present example embodiment.

(Elgamal Encryption Scheme)

Elgamal encryption is an example of public key encryption schemes with a multiplicative homomorphism. Each algorithm of Elgamal encryption operates as follows.

First, the key generation algorithm accepts the security parameter κ as input. Next, a κ-bit prime number q is randomly selected and a multiplicative group G of order q and its generator g are selected. Then, an integer x equal to or greater than 1 and less than q is selected uniformly at random and let $h=g^x$. Finally, an encryption key ek=(κ, q, G, g, h) and a decryption key dk=(ek, x) are outputted.

The encryption algorithm first accepts the encryption key ek=(κ, q, G, g, h) and a message m as input. Next, an integer r equal to or greater than 1 and less than q is selected uniformly at random, and let $c_a=g^r$ and $c_b=m \cdot h^r$. Finally, a ciphertext $c=(c_a, c_b)$ is outputted.

The decryption algorithm first accepts the decryption key dk=(ek, x) and the ciphertext $c=(c_a, c_b)$ as input. Next, $m'=c_b/((c_a)^x)$ is computed. Finally, the decryption result m' is outputted.

The equation below can confirm that the ciphertext $c=(c_a, c_b)=(g^r, m \cdot h^r)$ of the message m can be correctly decrypted to m by the decryption algorithm of Elgamal encryption scheme.

$$m'=c_b/(c_a)^x=(m \cdot h^r)/(g^r)^x=(m \cdot g^{xr})/(g^r)^x=m$$

The homomorphic operation algorithm first accepts the encryption key ek=(κ, q, G, g, h) and first and second ciphertexts $c_1=(c_{1,a}, c_{1,b})$ and $c_2=(c_{2,a}, c_{2,b})$ as input. Next, $c_a=c_{1,a} \cdot c_{2,a}$ and $c_b:=c_{1,b} \cdot c_{2,b}$ are computed. Finally, a homomorphic operation result $c=(c_a, c_b)$ is outputted.

For the ciphertext of a message $m_1$ ($c_{1,a}=g^r$, $c_{1,b}=m_1 \cdot h^r$) and the ciphertext of a message $m_2$ ($c_{2,a}=g^s$, $c_{2,b}=m_2 \cdot h^s$), the following two equations hold.

$$c_a=g^{(r+s)}$$

$$c_b=(m_1 \cdot m_2) \cdot h^{(r+s)}$$

Therefore, c is a ciphertext of $m_1 \cdot m_2$, and Elgamal encryption scheme has a multiplicative homomorphism.

Present Example

Example 1 relating to the second example embodiment is based on Elgamal encryption scheme to which the following modification is made. An example executed by the homomorphic encryption system 200 will be described below with reference to the reference signs in FIGS. 2 to 7.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter κ (the step A1).

Next, the key generation part 112 generates a homomorphic operation key, in addition to encryption and decryption keys. More specifically, the key generation part 112 of the key generation apparatus 110 randomly selects a κ-bit prime number q and selects a multiplicative group G of order q and its generator g. Then, an integer x equal to or greater than 1 and less than q is selected uniformly at random and let $h=g^x$. Next, the homomorphic operation key hk=(κ, q, G), the encryption key ek=(κ, q, G, g, h), and the decryption key dk=(ek, x) are generated (the step A2).

Then, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key ek=(κ, q, G, g, h) stored in the encryption key storage part 131 of the encryption key storage apparatus 130 (the step B2).

Next, the encryption part 153 selects uniformly at random an integer r equal to or greater than 1 and less than q, and computes $c_a=g^r$, $c_b=m \cdot h^r$ (the step B3).

Finally, the ciphertext output part 154 outputs the ciphertext $c=(c_a, c_b)$ generated in the step B3 (the step B4).

The decryption apparatus 160 performs the following steps.

First, the ciphertext input part 161 accepts the ciphertext c to be decrypted (the step C1).

Next, the decryption key acquisition part 162 acquires the decryption key dk=(κ, q, G, g, h, x) stored in the decryption key storage part 141 of the decryption key storage apparatus 140 (the step C2).

Then, the decryption part 163 computes $m'=c_b/((c_a)^x)$ (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1=(c_{1,a}, c_{1,b})$ and $c_2=(c_{2,a}, c_{2,b})$ on which a homomorphic operation is performed (the step D1).

Next, the homomorphic operation key acquisition part 172 acquires the homomorphic operation key hk=(κ, q, G) stored in the homomorphic operation key storage part 121 of the homomorphic operation key storage apparatus 120 (the step D2).

Then, the homomorphic operation part 173 computes $c_a=c_{1,a} \cdot c_{2,a}$ and $c_b: =c_{1,b} \cdot c_{2,b}$ (the step D3).

Finally, the homomorphic operation result output part 174 outputs the homomorphic operation result $c=(c_a, c_b)$ generated in the step D3 (the step D4).

The key verification apparatus 280 performs the following steps.

First, the ciphertext input part 281 accepts the ciphertext $c=(c_a, c_b)$ to be verified (the step E1).

Next, the verification part 284 generates a result=NG when $c_a=1$. Otherwise, the verification part 284 generates a result=OK (the step E2).

Finally, the verification result output part 285 outputs the verification result generated in the step E2 (the step E3).

In Example 1 relating to the second example embodiment, since the homomorphic operation key does not include g and h, using the homomorphic operation key alone, one is only able to compute the ciphertext when r=0 ($c_a=1, c_b=m$) as the ciphertext $c_a=g^r, c_b=m \cdot h^r$ for the message m. Therefore, the key verification process checks if the ciphertext $c=(c_a, c_b)$ to be verified satisfies $c_a=1$ and verifies that the ciphertext c is not created by an adversary who does not know g and h included in the encryption key. In the present example, the authority to execute encryption is different from the authority to execute homomorphic operation, and the authority of the homomorphic operation key is weaker than that of the encryption key. In other words, with the authority to execute homomorphic operation, one cannot generate any ciphertext other than the one when r=0.

Further, as in the first example embodiment, in Example 1 relating to the second example embodiment, the homomorphic operation key can be obtained by removing the elements in the encryption key unused in the homomorphic operation.

Example 2 Relating to the Second Example Embodiment

Next, a processing example of the homomorphic encryption system 200 relating to the present example embodiment based on lifted-Elgamal encryption scheme will be described. Lifted-Elgamal encryption scheme is an example of public key encryption schemes with an additive homomorphism. Note that, since the matters with respect to homomorphic public key encryption schemes and lifted-Elgamal encryption scheme are the same as those in Example 1, the description thereof will be omitted.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter κ (the step A1).

Next, the key generation part 112 of the key generation apparatus 110 randomly selects a κ-bit prime number q and selects a multiplicative group G of order q and its generator g. Then, an integer x equal to or greater than 1 and less than q is selected uniformly at random and h: $=g^x$ is set.

Next, the key generation part 112 generates a homomorphic operation key, in addition to encryption and decryption keys. More specifically, the homomorphic operation key is hk=(κ, q, G, g), the encryption key is ek=(κ, q, G, g, h), and the decryption key is dk=(ek, x) (the step A2).

Then, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key ek=(κ, q, G, g, h) stored in the encryption key storage part 131 of the encryption key storage apparatus 130 (the step B2).

Next, the encryption part 153 selects uniformly at random an integer r equal to or greater than 1 and less than q, and computes $c_a=g^r$, $c_b=g^m \cdot h^r$ (the step B3).

Finally, the ciphertext output part 154 outputs $(c_a, c_b)$ generated in the step B3 as a ciphertext (the step B4).

The decryption apparatus 160 performs the following steps.

First, the ciphertext input part 161 accepts the ciphertext $c=(c_a, c_b)$ to be decrypted (the step C1).

Next, the decryption key acquisition part 162 acquires the decryption key dk=(κ, q, G, g, h, x) stored in the decryption key storage part 141 of the decryption key storage apparatus 140 (the step C2).

Then, the decryption part 163 computes $M'=c_b/((c_a)^x)$. Further, the decryption part 163 computes $m'=D \log_g (M')$ (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1=(c_{1,a}, c_{1,b})$ and $c_2=(c_{2,a}, c_{2,b})$ on which a homomorphic operation is performed (the step D1).

Next, the homomorphic operation key acquisition part 172 acquires the homomorphic operation key $hk=(\kappa, q, G, g)$ stored in the homomorphic operation key storage part 121 of the homomorphic operation key storage apparatus 120 (the step D2).

Then, the homomorphic operation part 173 computes $c_a=c_{1,a} \cdot c_{2,a}$ and $c_b=c_{1,b} \cdot c_{2,b}$ (the step D3).

Finally, the homomorphic operation result output part 174 outputs the homomorphic operation result $c=(c_a, c_b)$ generated in the step D3 (the step D4).

The key verification apparatus 280 performs the following steps.

First, the ciphertext input part 281 accepts the ciphertext $c=(c_a, c_b)$ to be verified (the step E1).

Next, the verification part 284 generates a result=NG when $c_a=1$. Otherwise, the verification part 284 generates a result=OK (the step E2).

Finally, the verification result output part 285 outputs the verification result generated in the step E2 (the step E3).

In Example 2 relating to the second example embodiment, since the homomorphic operation key does not include h, using the homomorphic operation key alone, one is only able to compute the ciphertext when $r=0$ ($c_a=1$, $c_b=m$) as the ciphertext $c_a=g^r$, $c_b=m \cdot h^r$ for the message m. Therefore, the key verification process checks if the ciphertext $c=(c_a, c_b)$ to be verified satisfies $c_a=1$ and verifies that the ciphertext c is not created by an adversary who does not know h included in the encryption key. In the present example, the authority to execute encryption is different from the authority to execute homomorphic operation, and the authority of the homomorphic operation key is weaker than that of the encryption key. In other words, with the authority to execute homomorphic operation, one cannot generate any ciphertext other than the one when $r=0$.

Further, as in the first example embodiment, in Example 2 relating to the second example embodiment, the homomorphic operation key can be obtained by removing the elements in the encryption key unused in the homomorphic operation.

Example 3 Relating to the Second Embodiment

Next, a processing example of the homomorphic encryption system 200 relating to the present example embodiment based on the Elgamal encryption scheme on elliptic curves will be described. The Elgamal encryption scheme on elliptic curves is an example of public key encryption schemes with an additive homomorphism. The following first describes the Elgamal encryption scheme on elliptic curves and then discusses the processing example of the homomorphic encryption system 200 relating to the present example embodiment.

(Elgamal Encryption Scheme on Elliptic Curves)

The Elgamal encryption scheme on elliptic curves is an example of public key encryption schemes with an additive homomorphism. Each algorithm of the Elgamal encryption scheme on elliptic curves operates as follows.

First, the key generation algorithm accepts the security parameter $\kappa$ as input. Next, a $\kappa$-bit prime number q is randomly selected and the generator G of a group of order q on an elliptic curve E is selected. Then, an integer x equal to or greater than 1 and less than q is selected uniformly at random and let $P=x \cdot G$. Finally, an encryption key $ek=(\kappa, q, E, G, P)$ and a decryption key $dk=(ek, x)$ are outputted.

The encryption algorithm first accepts the encryption key $ek=(\kappa, q, G, g, h)$ and a message m as input. Next, an integer r equal to or greater than 1 and less than q is selected uniformly at random, and $C_a$: $=r \cdot G$ and $C_b$: $=m+r \cdot P$ are set. Finally, a ciphertext $c=(C_a, C_b)$ is outputted.

The decryption algorithm first accepts the decryption key $dk=(ek, x)$ and the ciphertext $c=(C_a, C_b)$ as input. Next, $m'=C_b-x \cdot C_a$ is computed. Finally, the decryption result m' is outputted.

The equation below can confirm that the ciphertext $c=(C_a, C_b)=(r \cdot G, m+r \cdot P)$ of the message m can be correctly decrypted to m by the decryption algorithm of the Elgamal encryption scheme on elliptic curves.

$$m'=C_b-x \cdot C_a=(m+r \cdot P)-x \cdot (r \cdot G)=m+r \cdot (x \cdot G)-x \cdot (r \cdot G)=m$$

The homomorphic operation algorithm first accepts the encryption key $ek=(\kappa, q, G, g, h)$ and first and second ciphertexts $c_1=(C_{1,a}, C_{1,b})$ and $c_2=(C_{2,a}, C_{2,b})$ as input. Next, $C_a=C_{1,a}+C_{2,a}$ and $C_b=C_{1,b}+C_{2,b}$ are computed. Finally, a homomorphic operation result $c=(C_a, C_b)$ is outputted.

For the ciphertext of a message $m_1$ ($C_{1,a}=r \cdot G$, $C_{1,b}=m_1+r \cdot P$) and the ciphertext of a message $m_2$ ($C_{2,a}=s \cdot G$, $C_{2,b}=m_2+s \cdot P$), the following two equations hold.

$$C_a=(r+s) \cdot G$$

$$C_b=(m_1+m_2)+(r+s) \cdot P$$

Therefore, c is a ciphertext of $m_1+m_2$, and the Elgamal encryption scheme on elliptic curves has an additive homomorphism.

Present Example

Example 3 relating to the second example embodiment is based on the Elgamal encryption scheme on elliptic curves to which the following modification is made. An example executed by the homomorphic encryption system 200 will be described below with reference to the reference signs in FIGS. 2 to 7.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter $\kappa$ (the step A1).

Next, the key generation part 112 of the key generation apparatus 110 randomly selects a $\kappa$-bit prime number q and selects the generator G of a group of order q on an elliptic curve E. Then, an integer x equal to or greater than 1 and less than q is selected uniformly at random and let $P=x \cdot G$.

Next, the key generation part 112 generates a homomorphic operation key, in addition to encryption and decryption keys. More specifically, the homomorphic operation key is $hk=(\kappa, q, E)$, the encryption key is $ek=(\kappa, q, E, G, P)$, and the decryption key is $dk=(\kappa, q, E, G, P, x)$ (the step A2).

Then, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key ek=(κ, q, E, G, P) stored in the encryption key storage part 131 of the encryption key storage apparatus 130 (the step B2).

Next, the encryption part 153 selects uniformly at random an integer r equal to or greater than 1 and less than q, and $C_a$: =r·G and $C_b$: =m+r·P are set (the step B3).

Finally, the ciphertext output part 154 outputs the ciphertext $c=(C_a, C_b)$ generated in the step B3 (the step B4).

The decryption apparatus 160 performs the following steps.

First, the ciphertext input part 161 accepts the ciphertext c to be decrypted (the step C1).

Next, the decryption key acquisition part 162 acquires the decryption key dk=(κ, q, E, G, P, x) stored in the decryption key storage part 141 of the decryption key storage apparatus 140 (the step C2).

Then, the decryption part 163 computes $m'=C_b-x\cdot C_a$ (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1=(C_{1,a}, C_{1,b})$ and $c_2=(C_{2,a}, C_{2,b})$ on which a homomorphic operation is performed (the step D1).

Next, the homomorphic operation key acquisition part 172 acquires the homomorphic operation key hk=(κ, q, E) stored in the homomorphic operation key storage part 121 of the homomorphic operation key storage apparatus 120 (the step D2).

Then, the homomorphic operation part 173 computes $C_a=C_{1,a}+C_{2,a}$ and $C_b=C_{1,b}+C_{2,b}$ (the step D3).

Finally, the homomorphic operation result output part 174 outputs the homomorphic operation result $c=(C_a, C_b)$ generated in the step D3 (the step D4).

The key verification apparatus 280 performs the following steps.

First, the ciphertext input part 281 accepts the ciphertext $c=(C_a, C_b)$ to be verified (the step E1).

Next, the verification part 284 generates a result=NG when $C_a=0$. Otherwise, the verification part 284 generates a result=OK (the step E2).

Finally, the verification result output part 285 outputs the verification result generated in the step E2 (the step E3).

In Example 3 relating to the second example embodiment, since the homomorphic operation key does not include P, using the homomorphic operation key alone, one is only able to compute the ciphertext when r=0 ($c_a=0$, $c_b=m$) as the ciphertext $C_a$: =r·G, $C_b$: =m+r·P for the message m. Therefore, the key verification process checks if the ciphertext $c=(c_a, c_b)$ to be verified satisfies $c_a=0$ and verifies that the ciphertext c is not created by an adversary who does not know P included in the encryption key. In the present example, the authority to execute encryption is different from the authority to execute homomorphic operation, and the authority of the homomorphic operation key is weaker than that of the encryption key. In other words, with the authority to execute homomorphic operation, one cannot generate any ciphertext other than the one when r=0.

Further, as in the first example embodiment, in Example 3 relating to the second example embodiment, the homomorphic operation key can be obtained by removing the elements in the encryption key unused in the homomorphic operation.

Third Example Embodiment

Figure 8:
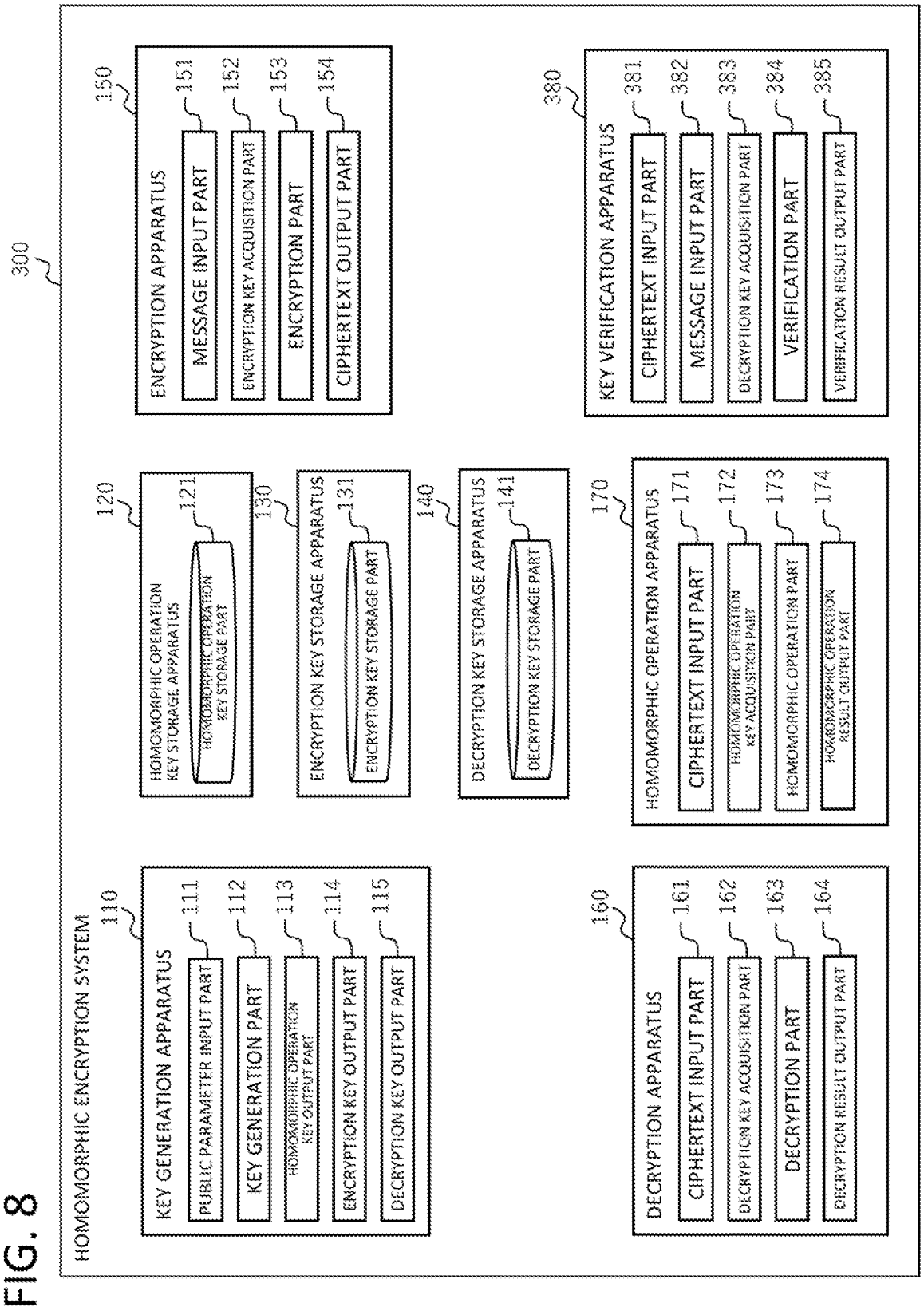
FIG. 8 is a block diagram illustrating the configuration of a homomorphic encryption system relating to a third example embodiment.

FIG. 8 is a block diagram illustrating the configuration of a homomorphic encryption system 300 relating to a third example embodiment. As shown in FIG. 8, the homomorphic encryption system 300 comprises a key verification apparatus 380 in addition to the configuration of the homomorphic encryption system 100 relating to the first example embodiment. Therefore, the following will not describe the configurations of the key generation apparatus 110, the homomorphic operation key storage apparatus 120, the encryption key storage apparatus 130, the decryption key storage apparatus 140, the encryption apparatus 150, the decryption apparatus 160, and the homomorphic operation apparatus 170.

The key verification apparatus 380 has a ciphertext input part 381 that accepts a ciphertext input, a message input part 382 that accepts a message input corresponding to the ciphertext input accepted by the ciphertext input part 381, a decryption key acquisition part 383 that acquires a stored decryption key, a verification part 384 that generates a result of verifying if a ciphertext is one generated for a message using an encryption key acquired by the decryption key acquisition part 383, and a verification result output part 385 that outputs the verification result.

Figure 9:
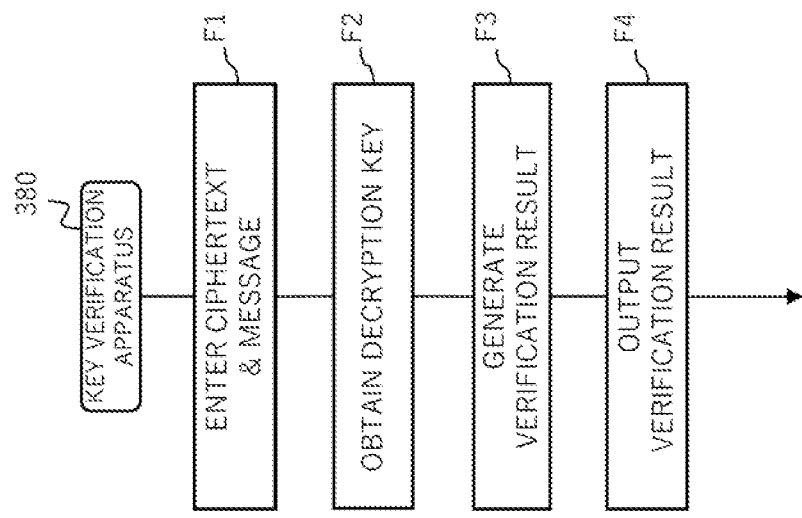
FIG. 9 is a flowchart illustrating a key verification process of the homomorphic encryption system relating to the third example embodiment.

The key verification apparatus 380 executes a key verification process as follows. FIG. 9 is a flowchart illustrating the key verification process.

First, the ciphertext input part 381 accepts a ciphertext to be verified, and the message input part 382 accepts a message, which is the result of decrypting the ciphertext to be verified (step F1).

Next, the decryption key acquisition part 383 acquires the decryption key stored in the decryption key storage part 141 of the decryption key storage apparatus 140 (step F2).

Then, the verification part 384 verifies if the ciphertext received in the step F1 is encrypted using the encryption key corresponding to the decryption key acquired in the step F2 and generates a verification result (step F3).

Finally, the verification result output part 385 outputs the verification result generated in the step F3 (step F4).

Note that the procedure described above is merely an example. For instance, the step F2 may be executed before the step F1.

Example 1 Relating to the Third Example Embodiment

Next, a processing example of the homomorphic encryption system 300 relating to the present example embodiment based on the Okamoto-Uchiyama encryption scheme will be described. The Okamoto-Uchiyama encryption scheme is an example of public key encryption schemes with an additive homomorphism. Note that, since the matters with respect to homomorphic public key encryption schemes and the Okamoto-Uchiyama encryption scheme are the same as those in the first example embodiment, the description thereof will be omitted.

The key generation apparatus 110, the homomorphic operation key storage apparatus 120, the encryption key storage apparatus 130, and the decryption key storage apparatus 140 perform the following steps.

First, the public parameter input part 111 of the key generation apparatus 110 accepts the security parameter κ (the step A1).

Next, the key generation part 112 of the key generation apparatus 110 randomly selects two κ-bit prime numbers p and q and sets $n=p^2q$. Then, an integer g that is between 1 and n inclusive and is prime to n (i.e., the greatest common divisor of g and n is 1) is randomly selected. If $g^{p-1}$ mod $p^2=1$, g is reselected. Next, $h=g^{p(p-1)}$ mod n is computed.

Next, the key generation part 112 generates a homomorphic operation key, in addition to encryption and decryption keys. More specifically, the homomorphic operation key hk=(κ, n, g), the encryption key ek=(κ, n, g, h) and the decryption key dk=(κ, n, g, h, p, q) are generated (the step A2).

Next, the homomorphic operation key output part 113 of the key generation apparatus 110 outputs the homomorphic operation key hk generated in the step A2 (the step A3). The outputted homomorphic operation key hk is stored in the homomorphic operation key storage part 121 of the homomorphic operation key storage apparatus 120 (the step A4).

Next, the encryption key output part 114 of the key generation apparatus 110 outputs the encryption key ek generated in the step A2 (the step A5). The outputted encryption key ek is stored in the encryption key storage part 131 of the encryption key storage apparatus 130 (the step A6).

Finally, the decryption key output part 115 of the key generation apparatus 110 outputs the decryption key dk generated in the step A2 (the step A7). The outputted decryption key dk is stored in the decryption key storage part 141 of the decryption key storage apparatus 140 (the step A8).

The encryption apparatus 150 performs the following steps.

First, the message input part 151 accepts a message m to be encrypted (the step B1).

Then, the encryption key acquisition part 152 acquires the encryption key ek=(κ, n, g, h) stored in the encryption key storage part 131 of the encryption key storage apparatus 130 (the step B2).

Next, encryption part 153 selects uniformly at random an integer r less than n and computes $c=g^m \cdot h^r$ mod n (the step B3).

Finally, the ciphertext output part 154 outputs the ciphertext c generated in the step B3 (the step B4).

The decryption apparatus 160 performs the following steps.

First, the ciphertext input part 161 accepts the ciphertext c to be decrypted (the step C1).

Next, the decryption key acquisition part 162 acquires the decryption key dk=(κ, n, g, h, p, q) stored in the decryption key storage part 141 of the decryption key storage apparatus 140 (the step C2).

Then, the decryption part 163 computes $c_p=c^{p-1}$ mod $p^2$ and also computes $c_L=(c_p-1)/p$.

Next, $g_p=g^{p-1}$ mod $p^2$ is computed and $g_L=(g_p-1)/p$ is also computed.

Then, $m'=c_L/g_L$ mod p is computed (the step C3).

Finally, the decryption result output part 164 outputs the decryption result m' generated in the step C3 (the step C4).

The homomorphic operation apparatus 170 performs the following steps.

First, the ciphertext input part 171 accepts first and second ciphertexts $c_1$ and $c_2$ on which a homomorphic operation is performed (the step D1).

Next, the homomorphic operation key acquisition part 172 acquires the homomorphic operation key hk=(κ, n, g) stored in the homomorphic operation key storage part 121 of the homomorphic operation key storage apparatus 120 (the step D2).

Then, the homomorphic operation part 173 computes $c=c_1 \cdot c_2$ mod n (the step D3).

Finally, the homomorphic operation result output part 174 outputs the homomorphic operation result c generated in the step D3 (the step D4).

The key verification apparatus 380 performs the following steps.

First, the ciphertext input part 381 accepts the ciphertext c to be verified, and the message input part 382 accepts the message m, which is the result of decrypting the ciphertext to be verified (the step F1).

Next, the decryption key acquisition part 383 acquires the decryption key dk=(κ, n, g, h, p, q) stored in the decryption key storage part 141 of the decryption key storage apparatus 140 (the step F2).

Then, the verification part 384 computes $c'=c/g^m$ and $c''=c'^{(q-1)/2}$ mod n.

Next, the verification part 384 generates a result=OK when c''=1. Otherwise, the verification part 384 generates a result=NG (the step F3).

Finally, the verification result output part 385 outputs the verification result generated in the step F3 (the step F4).

It should be noted that different methods may be used to compute h in the step A2 of the key generation process and c'' in the step F3 of the key verification process, as long as, for x and y that satisfy xy mod λ(n)=1 (where λ denotes the Carmichael function), $h=g^x$ mod n, $c''=c'^y$ mod n. For instance, when $h=g^{p(p-1)/2}$ mod n, $h=g^{p(q-1)}$ mod n, and $h=g^{p(q-1)/2}$ mod n, $c''=c'^{(g-1)}$ mod n, $c''=c'^{(p-1)/2}$ mod n, and $c''=c'^{(p-1)}$ mod n, respectively.

In Example 1 relating to the third example embodiment, since the homomorphic operation key does not include h, using the homomorphic operation key alone, one is only able to compute the ciphertext $c=g^m \cdot h'^r$ mod n computed using $h'=g^n$ mod n instead of $h=g^{p(p-1)}$ mod n, as the ciphertext $c=g^m \cdot h^r$ mod n for the message m.

Here, $$c'=c/g^m=h^r \bmod n = g^{p(p-1)r} \bmod n$$

$$c''=c'^{(q-1)/2} \bmod n = p^{p(p-1)(q-1)r/2} \bmod n = 1,$$

however, the ciphertext computed using h' will be $$c'=c/g^m=h'^r \bmod n = g^{ppqr} \bmod n$$

$$c''=c'^{(q-1)/2} \bmod n = g^{ppq(q-1)r/2} \bmod n \neq 1$$

Therefore, the key verification process in Example 1 relating to the third example embodiment verifies if c''=1. This verifies that the ciphertext is not created by an adversary who does not know the element included in the encryption key but not in the homomorphic operation key. In the present example, the authority to execute encryption is different from the authority to execute homomorphic operation, and the authority of the homomorphic operation key is weaker than that of the encryption key. In other words, with the authority to execute homomorphic operation, one cannot generate any ciphertext other than the one computed using $h'=g^n$ mod n instead of $h=g^{p(p-1)}$ mod n Further, as in the first example embodiment, in Example 1 relating to the third example embodiment, the homomorphic operation key can be obtained by removing the element in the encryption key unused in the homomorphic operation.

Fourth Example Embodiment

Figure 10:
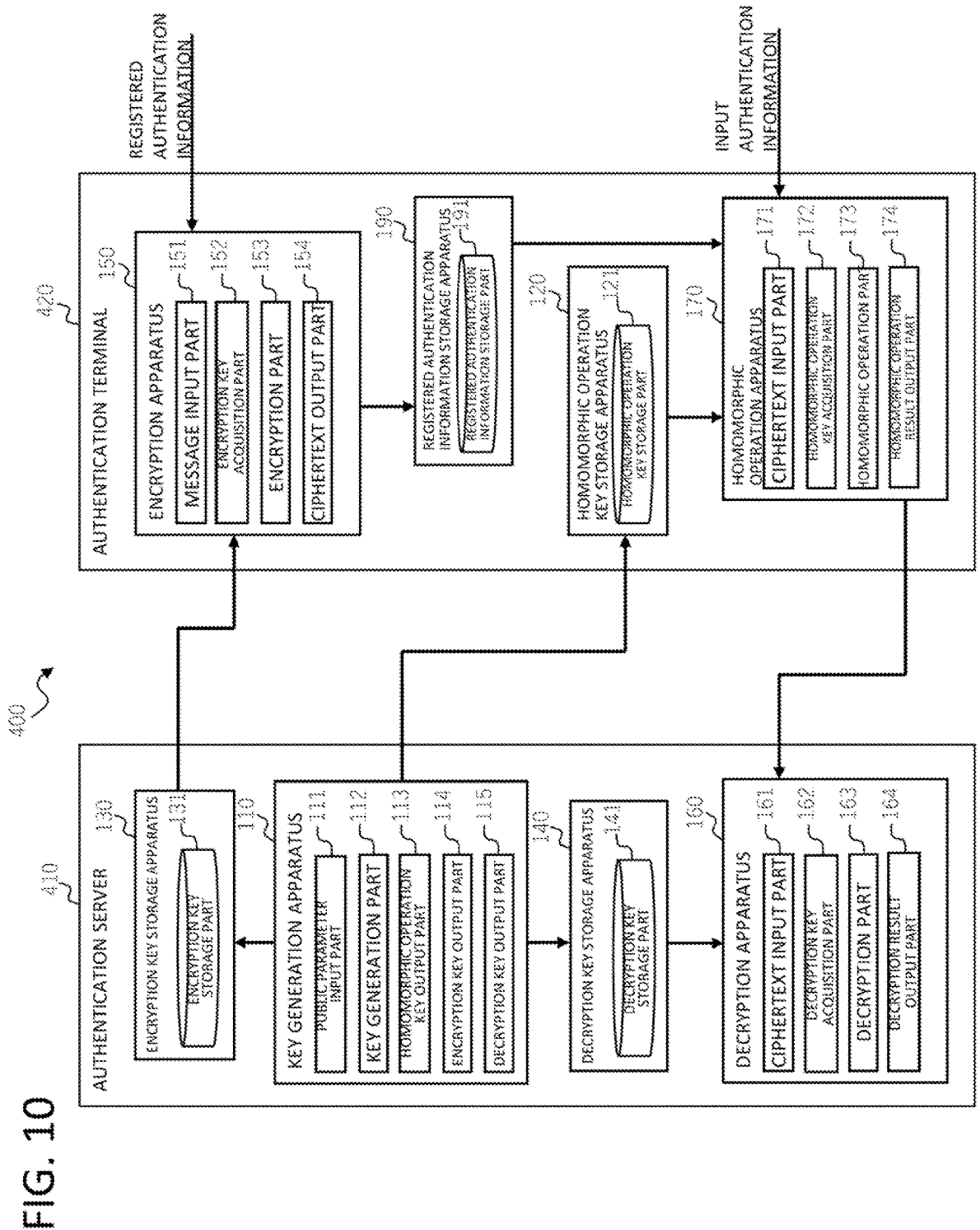
FIG. 10 is a block diagram illustrating the configuration of a homomorphic encryption system relating to a fourth example embodiment.

FIG. 10 is a block diagram illustrating the configuration of a homomorphic encryption system 400 relating to a fourth example embodiment. The homomorphic encryption system 400 relating to the fourth example embodiment is a result of applying the configuration of the homomorphic encryption system 100 relating to the first example embodiment to identity authentication. Therefore, the same reference signs as those in the first example embodiment are used, and the description of each configuration discussed in the first example embodiment will be omitted.

As shown in FIG. 10, the homomorphic encryption system 400 is a server-client system comprising an authentication server 410 and an authentication terminal 420.

The authentication server 410 comprises the key generation apparatus 110, the encryption key storage apparatus 130, the decryption key storage apparatus 140, and the decryption apparatus 160. Meanwhile, the authentication terminal 420 comprises the homomorphic operation key storage apparatus 120, the encryption apparatus 150, the homomorphic operation apparatus 170, and a registered authentication information storage apparatus 190. Note that the registered authentication information storage apparatus 190 is a storage apparatus for storing registered authentication information encrypted by the encryption apparatus 150.

The homomorphic encryption system 400 configured as above performs identity authentication as follows.

As already stated, the key generation apparatus 110 generates an encryption key relating to the authority to generate a ciphertext from a plaintext, a homomorphic operation key relating to the authority to execute a homomorphic operation on a ciphertext that remains encrypted, and a decryption key relating to the authority to decrypt ciphertext. The generated encryption and decryption keys are stored in the encryption key storage apparatus 130 and the decryption key storage apparatus 140, respectively, of the authentication server 410. The generated homomorphic operation key is stored in the homomorphic operation key storage apparatus 120 of the authentication terminal.

At authentication information registration, a user enters authentication information to be registered into the encryption apparatus 150 of the authentication terminal 420. Here, the authentication information includes biometric information and a password. Then, the encryption apparatus 150 of the authentication terminal 420 acquires the encryption key from the encryption key storage apparatus 130 of the authentication server 410 and encrypts the registered authentication information using this encryption key. The encrypted registered authentication information is stored in the registered authentication information storage apparatus 190.

When an authentication process is executed, the user enters input authentication information into the homomorphic operation apparatus 170 of the authentication terminal 420. Then, the homomorphic operation apparatus 170 of the authentication terminal 420 authenticates the supplied input authentication information using the stored registered authentication information. At this time, the homomorphic operation apparatus 170 executes the authentication process by performing a homomorphic operation on the registered authentication information that remains encrypted. The homomorphic operation key stored in the homomorphic operation key storage apparatus 120 is used in the homomorphic operation performed by the homomorphic operation apparatus 170.

Since the homomorphic operation apparatus 170 performs the authentication process while the registered authentication information remains encrypted, the authentication result is also encrypted. The ciphertext of the authentication result is transmitted to the decryption apparatus 160 of the authentication server 410, and the decryption apparatus 160 decrypts the ciphertext of the authentication result using the decryption key. From this, the authentication server determines whether or not the input authentication information supplied to the authentication terminal 420 is authentic.

Since the authentication terminal 420 does not keep the encryption key in the identity authentication described above, a malicious individual who has obtained the authentication terminal 420 cannot encrypt his or her own authentication information. As a result, the identity authentication executed as above reduces the vulnerability to identity theft.

The above configuration is an application example of the present invention, and in addition to the first example embodiment, the second and the third example embodiments may be put to use by utilizing the key verification apparatuses 280 and 380. Further, the encryption apparatus 150 may be provided separately from the authentication terminal 420. The present invention can be appropriately applied as long as the encryption key and the homomorphic operation key are managed separately and only the homomorphic operation key is used when the authentication process is executed.

Fifth Example Embodiment

Figure 11:
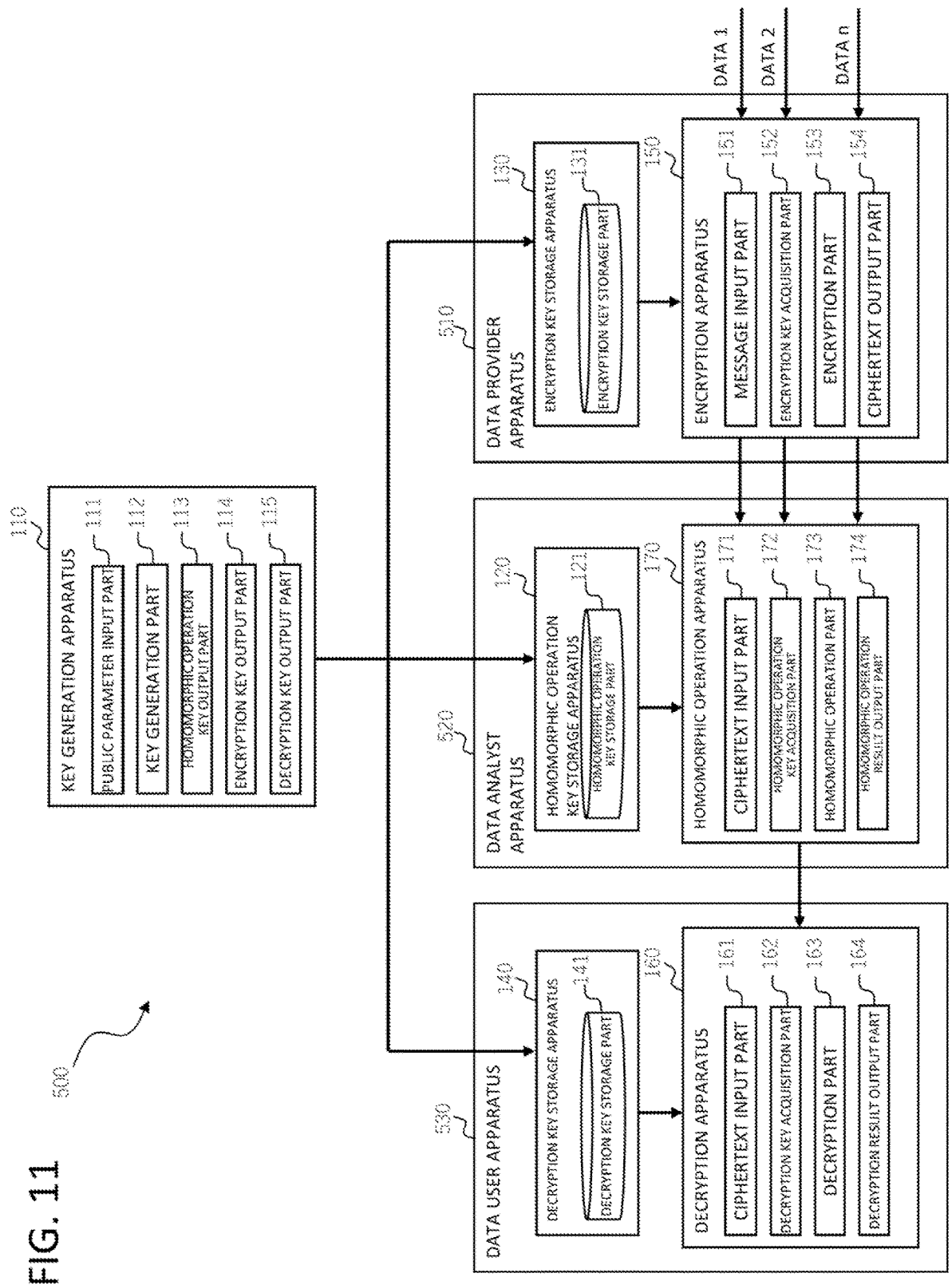
FIG. 11 is a block diagram illustrating the configuration of a homomorphic encryption system relating to a fifth example embodiment.

FIG. 11 is a block diagram illustrating the configuration of a homomorphic encryption system 500 relating to a fifth example embodiment. The homomorphic encryption system 500 relating to the fifth example embodiment is a result of applying the configuration of the homomorphic encryption system 100 relating to the first example embodiment to secure computation. Therefore, the same reference signs as those in the first example embodiment are used, and the description of each configuration discussed in the first example embodiment will be omitted.

As shown in FIG. 11, the homomorphic encryption system 500 comprises the key generation apparatus 110, a data provider apparatus 510, a data analyst apparatus 520, and a data user apparatus 530.

The data provider apparatus 510 comprises the encryption key storage apparatus 130 and the encryption apparatus 150. The data analyst apparatus 520 comprises the homomorphic operation key storage apparatus 120 and the homomorphic operation apparatus 170. The data user apparatus 530 comprises the decryption key storage apparatus 140 and the decryption apparatus 160.

The homomorphic encryption system 500 configured as above performs secure computation as follows.

As already stated, the key generation apparatus 110 generates an encryption key relating to the authority to generate a ciphertext from a plaintext, a homomorphic operation key relating to the authority to execute a homomorphic operation on a ciphertext that remains encrypted, and a decryption key relating to the authority to decrypt ciphertext. The generated encryption, homomorphic operation, and decryption keys are stored in the encryption key storage apparatus 130 of the data provider apparatus 510, the homomorphic operation key storage apparatus 120 of the data analyst apparatus 520, and the decryption key storage apparatus 140 of the data user apparatus 530, respectively.

In secure computation, data 1 to n provided by each user are first supplied to the data provider apparatus 510. Here, the data provided by each user may be sensitive information such as voting score and personal information. Further, a plurality of the data provider apparatuses 510 may be provided, and each user may enter data into a separate data provider apparatus 510.

Then, the encryption apparatus 150 of the data provider apparatus 510 encrypts the data 1 to n using the encryption key stored in the encryption key storage apparatus 130. The encrypted data 1 to n are transmitted to the data analyst apparatus 520.

In the data analyst apparatus 520, the homomorphic operation apparatus 170 analyzes the encrypted data 1 to n that remain encrypted. In this analysis, it is possible to perform various types of analysis such as, for instance, aggregating voting scores or averaging values in personal information. The homomorphic operation for this analysis uses the homomorphic operation key stored in the homomorphic operation key storage apparatus 120 of the data analyst apparatus 520.

Since the homomorphic operation apparatus 170 performs the analysis while the data remain encrypted, the analysis result is also encrypted. The ciphertext of the analysis result is transmitted to the decryption apparatus 160 of the data user apparatus 530, and the decryption apparatus 160 decrypts the ciphertext of the analysis result using the decryption key. As a result, the data user apparatus 530 obtains the result of analyzing the data 1 to n provided by each user.

In the secure computation performed as described above, since the data 1 to n provided by each user remain encrypted while being analyzed, the information provided by the users is kept confidential. Moreover, since the data analyst apparatus 520 does not hold the encryption key, a malicious third party cannot tamper with the analysis result by encrypting false data and adding it to the result using the data analyst apparatus 520. This increases the reliability of the analysis result obtained by the data user apparatus 530.

The above configuration is an application example of the present invention, and in addition to the first example embodiment, the second and the third example embodiments may be put to use by utilizing the key verification apparatuses 280 and 380. Further, although the key generation apparatus 110 is provided separately in the configuration of the present example, the key generation apparatus 110 may be provided within the data user apparatus 530.

Further, the disclosure of each Patent Literature and Non-Patent Literature cited above is incorporated herein in its entirety by reference thereto. It is to be noted that it is possible to modify or adjust the example embodiments or examples within the whole disclosure of the present invention (including the Claims) and based on the basic technical concept thereof. For instance, the same method as disclosed above may be applied to a homomorphic public key encryption scheme other than the homomorphic public key encryption schemes described above (including additive homomorphic public key encryption schemes, multiplicative homomorphic public key encryption schemes, somewhat homomorphic public key encryption schemes, and fully homomorphic public key encryption schemes). Further, it is possible to variously combine or select (or at least partially remove) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims, and the technical concept of the present invention. Particularly, any numerical ranges disclosed herein should be interpreted that any intermediate values or subranges falling within the disclosed ranges are also concretely disclosed even without specific recital thereof.

INDUSTRIAL APPLICABILITY

The present invention is suitably applied to a system that performs identity authentication and secure computation.

REFERENCE SIGNS LIST

100: homomorphic encryption system
110: key generation apparatus
111: public parameter input part
112: key generation part
113: homomorphic operation key output part
114: encryption key output part
115: decryption key output part
120: homomorphic operation key storage apparatus
121: homomorphic operation key storage part
130: encryption key storage apparatus
131: encryption key storage part
140: decryption key storage apparatus
141: decryption key storage part
150: encryption apparatus
151: message input part
152: encryption key acquisition part
153: encryption part
154: ciphertext output part
160: decryption apparatus
161: ciphertext input part
162: decryption key acquisition part
163: decryption part
164: decryption result output part
170: homomorphic operation apparatus
171: ciphertext input part
172: homomorphic operation key acquisition part
173: homomorphic operation part
174: homomorphic operation result output part
200: homomorphic encryption system
280: key verification apparatus
281: ciphertext input part
284: verification part
285: verification result output part
300: homomorphic encryption system
380: key verification apparatus
381: ciphertext input part
382: message input part
383: decryption key acquisition part
384: verification part
385: verification result output part
400: homomorphic encryption system
410: authentication server
420: authentication terminal
500: homomorphic encryption system
510: data provider apparatus
520: data analyst apparatus
530: data user apparatus

What is claimed is:

1. An encryption system comprising:
a key generation apparatus that generates an encryption key relating to authority to generate a ciphertext from a plaintext, a homomorphic operation key relating to authority to execute a homomorphic operation on the ciphertext that remains encrypted by removing an element of the encryption key that is not used for the homomorphic operation, and a decryption key relating to authority to decrypt the ciphertext;
an encryption apparatus that generates the ciphertext from the plaintext using the encryption key;
a homomorphic operation apparatus that executes the homomorphic operation on the ciphertext using the homomorphic operation key; and
a decryption apparatus that decrypts the ciphertext using the decryption key,
wherein each of the key generation apparatus, the encryption apparatus, the homomorphic operation apparatus and the decryption apparatus comprises a processor and a memory storing instructions executable by the processor.

2. The encryption system according to claim 1, wherein the key generation apparatus generates a pair of the encryption key and the decryption key using a public key encryption scheme.

3. The encryption system according to claim 1 further comprising a key verification apparatus that verifies whether or not a supplied ciphertext has been generated using the encryption key.

4. The encryption key according to claim 3, wherein the key verification apparatus performs verification using the decryption key.

5. The encryption system according to claim 1, wherein the plaintext is authentication information to be registered,
the homomorphic operation apparatus generates a ciphertext of a result of authentication between supplied authentication information and the authentication information that is to be registered by performing the homomorphic operation on the authentication information and the authentication information that is to be registered and that is encrypted, and
the decryption apparatus acquires the result of the authentication by decrypting the ciphertext of the result of authentication.

6. The encryption system according to claim 1, wherein the encryption apparatus generates a plurality of ciphertexts from a plurality of plaintexts,
the homomorphic operation apparatus generates a ciphertext of a result of analyzing the plurality of plaintexts by performing the homomorphic operation on the plurality of ciphertexts, and
the decryption apparatus acquires the result of analyzing the plurality of plaintexts by decrypting the ciphertext of the result of analyzing.

7. A key generation apparatus comprising:
a processor; and
a memory storing instructions executable by the processor to:
generate a pair of an encryption key and a decryption key using a public key encryption scheme; and
generate a homomorphic operation key for executing a homomorphic operation on a ciphertext that remains encrypted and that is generated using the encryption key by removing an element of the encryption key that is not used for the homomorphic operation.

8. The key generation apparatus according to claim 7, wherein
the ciphertext is generated from authentication information,
the homomorphic operation is performed on the authentication information to generate a ciphertext of a result of authentication, and
the decryption key is used for decrypting the result of authentication.

9. The key generation apparatus according to claim 7, wherein
the homomorphic operation is performed on a plurality of ciphertexts from a plurality of plaintexts to generate a ciphertext of a result of analyzing the plurality of plaintexts, and
the decryption key is used for decrypting the result of analyzing.

10. A key generation method including:
generating, by a processor, a pair of an encryption key and a decryption key using a public key encryption scheme; and
generating, by the processor, a homomorphic operation key for executing a homomorphic operation on a ciphertext that remains encrypted and that is generated using the encryption key by removing an element of the encryption key that is not used for the homomorphic operation.

11. The key generation method according to claim 10, wherein
the ciphertext is generated from authentication information,
the homomorphic operation is performed on the authentication information to generate a ciphertext of a result of authentication, and
the decryption key is used for decrypting the result of authentication.

12. The key generation method according to claim 10, wherein
the homomorphic operation is performed on a plurality of ciphertexts from a plurality of plaintexts to generate a ciphertext of a result of analyzing the plurality of plaintexts, and
the decryption key is used for decrypting the result of analyzing.

13. A homomorphic operation apparatus comprising:
a processor; and
a memory storing instructions executable by the processor to:
accept input of a ciphertext generated using an encryption key of a pair of the encryption key and a decryption key generated using a public key encryption scheme;
acquire a homomorphic operation key relating to authority to execute a homomorphic operation on the ciphertext that remains encrypted and that is generated by removing an element of the encryption key that is not used for the homomorphic operation; and
execute the homomorphic operation on the ciphertext that remains encrypted using the homomorphic operation key.

14. The homomorphic operation apparatus according to claim 13, wherein
the ciphertext is generated from authentication information,
the homomorphic operation is performed on the authentication information to generate a ciphertext of a result of authentication, and the decryption key is used for decrypting the result of authentication.

15. The homomorphic operation apparatus according to claim 13, wherein
the homomorphic operation is performed on a plurality of ciphertexts from a plurality of plaintexts to generate a ciphertext of a result of analyzing the plurality of plaintexts, and
the decryption key is used for decrypting the result of analyzing.

16. The homomorphic operation apparatus according to claim 13, wherein the instructions are executable by the processor to further verify whether or not a supplied ciphertext has been generated using the encryption key.

\* \* \* \* \*